(12) United States Patent
Kataoka et al.

(10) Patent No.: US 6,725,829 B2
(45) Date of Patent: Apr. 27, 2004

(54) COMBUSTION CONTROL APPARATUS OF DIESEL ENGINE

(75) Inventors: Motoshi Kataoka, Hiroshima (JP); Akihiro Kobayashi, Hiroshima (JP); Tomoaki Saito, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/394,039

(22) Filed: Mar. 24, 2003

(65) Prior Publication Data

US 2003/0196635 A1 Oct. 23, 2003

(30) Foreign Application Priority Data

Mar. 28, 2002 (JP) ........................................ 2002-092537
Sep. 12, 2002 (JP) ........................................ 2002-266517

(51) Int. Cl.⁷ ................................................ F02B 3/00
(52) U.S. Cl. ................................ 123/299; 123/568.21
(58) Field of Search ................................ 123/299, 300, 123/478, 480, 531, 533, 568.21, 568.26

(56) References Cited

U.S. PATENT DOCUMENTS

| | | | | |
|---|---|---|---|---|
| 5,979,398 A | * | 11/1999 | Yanagihara | ................ 123/299 |
| 6,216,676 B1 | | 4/2001 | Gotoh et al. | |
| 6,588,204 B2 | * | 7/2003 | Hirota et al. | ................ 60/297 |
| 6,591,818 B2 | * | 7/2003 | Sasaki et al. | ........... 123/568.12 |
| 6,612,292 B2 | * | 9/2003 | Shirakawa | ................ 123/501 |
| 6,622,690 B2 | * | 9/2003 | Ando et al. | ................ 123/295 |
| 6,640,772 B2 | * | 11/2003 | Gatellier et al. | ............ 123/298 |
| 6,651,614 B2 | * | 11/2003 | Flamig-Vetter et al. | ..... 123/301 |

* cited by examiner

Primary Examiner—John Kwon
(74) Attorney, Agent, or Firm—Nixon Peabody LLP; Donald R. Studebaker

(57) ABSTRACT

In a combustion control apparatus of a direct-injection diesel engine, in which a fuel is injected at an early timing with an EGR ratio more than a first predetermined value at pre-mixed combustion area (H) where an engine load is relatively low so as to provide a pre-mixed combustion mode, while a diesel combustion mode is provided with the EGR ratio less than a second predetermined value at diffusion combustion area (D), when the operation of the engine 1 transfers from one of the pre-mixed combustion area (H) and the diffusion combustion area (D) to the other thereof, an opening of the an EGR valve 35 is changed and thereby a fuel injection mode is changed after an actual EGR ratio: EGR becomes a predetermined value: EGR1. When the EGR ratio: EGR is within a certain range (SB5→SB13→SB15), a follow-up injection (latter-injection) is executed (SB15, SB7) so that combustion thereby may begin at the timing when the main-combustion beginning at around TDC completes mostly. The latter-injection can make smoke produced by the main-injection burn again effectively. As a result, smoke concentration in the exhaust gas can be reduced greatly, and a transient deterioration of the exhaust gas condition at the transition between the operating areas (H), (D) and the like can be avoided.

17 Claims, 22 Drawing Sheets

COMBUSTION CONTROL APPARATUS OF DIESEL ENGINE

BACKGROUND OF THE INVENTION

The present invention relates to a combustion control apparatus of a direct-injection diesel engine, and in particular, belongs to a technical field relating to a transient control at a change of a combustion state of engine.

In general, a direct-injection diesel engine injects a fuel into a combustion chamber with high pressure and high temperature at around the top dead center of the compression stroke of cylinder, so that the fuel is burned by its self-ignition. Here, the fuel injected into the combustion chamber proceeds being divided (atomized) into minute liquid drops by a collision with air having high density, and forms substantially a cone-shape fuel spray. The fuel evaporates from surfaces of the fuel drops and forms a fuel mixture by involving air surrounding around mainly a front end and a periphery of the fuel spray. Then, the fuel mixture is self-ignited when it becomes a certain condition with its appropriate concentration and temperature necessary for an ignition, and begins to burn (pre-mixed combustion). Then, it is considered that the portion beginning to burn becomes a core and diffusion combustion is performed involving surrounding fuel vapor and air.

In such a normal combustion of the diesel engine (hereinafter, also referred to as diesel combustion, simply), the initial pre-mixed combustion may be followed by the diffusion combustion that burns most part of fuel. Here, nitrogen oxides (NOx) is produced at a portion, in which an air excessive ratio $\lambda$ is nearly 1 in the fuel spray (fuel mixture) having un-homogeneous concentration, due to a rapid generation of heat, and also smoke is produced at a portion, in which a fuel concentration is too high, due to a lack of air. Conventionally, some measures to reduce NOx or smoke are took, such as recirculating part of an exhaust gas into an intake air (Exhaust Gas Recirculation, hereinafter, referred to as EGR, simply) and increasing injection pressure of fuel.

Such recirculating the inert exhaust gas into the intake air system by EGR may suppress production of NOx by decreasing combustion temperature but, on the other hand, promote production of smoke with a large amount of EGR decreasing oxygen in the intake air. Further, increasing injection pressure of fuel may promote minute fuel spray and improve air utilization rate by increasing penetration of the fuel spray, resulting in suppression of smoke, but, on the other hand, it may make a condition where NOx is produced easily. In other words, the conventional combustion of diesel engine provided a trade-off relationship on NOx reduction and smoke reduction, so that it was difficult to reduce both NOx and smoke coincidently.

In contrast, new combustion modes have been recently proposed that provide a combustion sate consisting of pre-mixed combustion mainly by advancing the timing of fuel injection and thereby can reduce NOx and smoke coincidently and greatly. These are generally known as the name of diesel pre-mixed combustion or pre-mixed compression ignition combustion. This is, for example, a new combustion mode, in which a large amount of exhaust gas is recirculated by EGR and a fuel is injected at relatively early timing of the compression stroke of cylinder to mix with air sufficiently, so that the pre-mixed mixture is self-ignited at the end of the compression stroke of cylinder and burns (for example, as shown in Japanese Patent Laid-Open Publication No. 2000-110669).

It is preferable that the rate of recirculated exhaust gas into intake air by EGR (EGR ratio) at such combustion state is set at a much higher level than that at the above-described diesel combustion. That is, a rage amount of exhaust gas having larger thermal capacity than that of air is mixed and thereby density of fuel and oxygen in the pre-mixed mixture is reduced, and as a result, the timing of self-ignition of the pre-mixed mixture may be delayed until near the top dead center of compression of cylinder (TDC) by extending its delay time of ignition. Further, the inert exhaust gas disperses evenly around fuel and oxygen in the pre-mixed mixture and absorbs the heat by combustion, and thereby the production of NOx may be suppressed greatly.

However, because increasing the rate of recirculated exhaust gas in the intake air by EGR means decreasing the amount of air in return, it may be difficult to perform the above-described combustion at an engine operating area where the engine load is relatively high. Thus, conventionally, when the engine operation is at relatively low load, an early fuel injection like the above is performed and EGR ratio is controlled higher than a first predetermined value that is relatively high, resulting in pre-mixed compression ignition combustion. Whereas, when the engine operation is at relatively high load, fuel is injected at around the top dead center by changing fuel injection mode, resulting in diesel combustion. Here, EGR ratio is controlled lower than a second predetermined value that is lower than the first predetermined value in order to suppress an increase of smoke.

In the meantime, in a case where the engine combustion mode is changeable between the pre-mixed compression ignition combustion and the diesel combustion like the above, there exists some problems, such as a transient deterioration of exhaust gas condition at its changing and an occurrence of large noise. That is, when changed from the pre-mixed compression ignition combustion to the diesel combustion, the EGR ratio is changed from a state where it is higher than the first predetermined value to another state where it is lower than the second predetermined value, by reducing the amount of recirculated exhaust gas by EGR. Here, if only fuel injection mode is changed at once to its injection at around TDC for the diesel combustion, the combustion consisting of the diffusion combustion mainly is performed along with an excessive EGR ratio because adjusting controlling the amount of exhaust gas recirculation needs a certain time. As a result, smoke is produced greatly.

On the other hand, in changing from the diesel combustion to the pre-mixed compression ignition combustion, if only fuel injection mode is changed to its early injection when the EGR ratio is not sufficiently high, the fuel may be self-ignited at the too-early timing because adjusting the amount of exhaust gas recirculation needs a certain time as well. As a result, considerably large noise of combustion is produced and an increase of NOx is produced rapidly as well. In addition, a large amount of smoke is produced by combustion of fuel having an insufficient mixture with intake air.

In view of the above-described problems, the present invention has been devised and its object is to suppress a transient deterioration of exhaust gas condition and a production of large noise by applying an effective control to procedures of changing combustion of a diesel engine, in which its combustion is changeable between a first combustion state where its combustion consists of pre-mixed combustion mainly (for example, pre-mixed compression ignition combustion described above) and a second combustion state where its combustion consists of diffusion combustion mainly (for example, conventional diesel combustion).

SUMMARY OF THE INVENTION

In order to achieve the above-described object, the present invention provides solution means, in which a farther fuel is injected at a proper timing (latter-injection) after a main combustion begins at around the top dead center of compression of cylinder when a combustion state of diesel engine transfers between the above-described first combustion state and the second combustion state, and thereby smoke produced by the main combustion is burned again by the combustion of this latter-injected fuel.

Specifically, the first aspect of the present invention is premised on a combustion control apparatus of a diesel engine, comprising a fuel injector projecting into a combustion chamber of an engine cylinder, exhaust gas recirculation amount adjusting means for adjusting the amount of recirculated exhaust gas to the combustion chamber, main-injection control means for controlling the fuel injector, so that the fuel injector injects the fuel at least during the intake stroke and/or the compression stroke of cylinder (main-injection) at a first engine operating condition to make a first combustion state where the rate of pre-mixed combustion is greater than that of diffusion combustion, while so that the fuel injector injects the fuel at least at around the top dead center of the compression stroke of cylinder at a second engine operating condition to make a second combustion state where the rate of diffusion combustion is greater than that of pre-mixed combustion, and exhaust gas recirculation control means for controlling said exhaust gas recirculation amount adjusting means, in which an EGR value relating to the amount of recirculated exhaust gas at the first engine operating condition is larger than a first predetermined value, while the EGR value at the second engine operating condition is smaller than a second predetermined value which is smaller than the first predetermined value.

Further, it comprises latter-injection control means for performing a latter-injection when the engine operating condition transfers from one of the first and second engine operating conditions to the other thereof, wherein the fuel is injected by the fuel injector within a predetermined range of the expansion stroke and/or the exhaust stroke of cylinder after the main-injection fuel injected into the combustion chamber by controlling the fuel injector by the main-injection control means begins to burn.

According to the above-described structure, firstly, when the engine operating condition is at the first engine operating condition, the fuel is main-injected at least during the intake stroke and/or the compression stroke of cylinder by controlling the fuel injector by the main-injection control means and the ratio of exhaust gas recirculation becomes larger than a certain value (EGR value≧first predetermined value) by controlling the exhaust gas recirculation amount adjusting means by the exhaust gas recirculation control means. Thus, the fuel injected at the early timing into the combustion chamber of cylinder disperses considerably and widely in the combustion chamber and mixes sufficiently with air and recirculated exhaust gas, and thereby highly homogeneous mixture can be formed. Accordingly, it makes the first combustion state where the rate of pre-mixed combustion is relatively large with self-ignition at the timing of the end of the compression stroke. In this combustion state, the amount of produced NOx and smoke is very small.

On the other hand, when the engine operating condition is at the second engine operating condition, the fuel is main-injected at least at around the top dead center of the compression stroke of cylinder. Accordingly, it makes the second combustion state where the rate of diffusion combustion is relatively large. Thus, reduction of NOx and smoke can be achieved by the exhaust gas recirculation to the intake air, and enough air supply can be maintained to increase an engine output by the exhaust gas recirculation whose ratio is smaller than a certain value (EGR value≦second predetermined value).

Further, when the engine operating condition transfers from one of the first and second engine operating conditions to the other thereof, the fuel is latter-injected within a predetermined range of the expansion stroke and/or the exhaust stroke of cylinder after the main-injected fuel begins to burn by controlling the fuel injector by the latter-injection control means. Thus, smoke produced along with the combustion of the main-injected fuel can be burned again during the combustion of the latter-injected fuel, and thereby the concentration of smoke in exhaust gas can be reduced.

Here, in the above-described fuel control apparatus of engine, the timing of the main-injection at the first engine operating condition is advanced from the timing of that at the second engine operating condition (the second aspect of the present invention).

In a combustion control apparatus of engine according to the third aspect of the present invention, the latter-injection control means performs the latter-injection by the fuel injector after a heat release rate by the combustion of the main-injection fuel becomes less than a predetermined value.

By performing the later-injection after the heat release rate by the combustion of the main-injection fuel becomes less than a predetermined value, the combustion of the latter-injected fuel urges the smoke that has been already produced to burn again without producing further smoke by the combustion of the main-injected fuel. Further, because a state is made at that time where smoke is relatively easy to react oxygen without any uneven distribution of smoke in cylinder, burning smoke can be performed effectively. In addition, because the latter-injection is performed at the relatively late timing and thus the temperature of cylinder does not become so high, the combustion of the latter-injected fuel itself may not cause production, growth and condensation of smoke cores. Thus, according to the present invention, the concentration of smoke in exhaust gas can be decreased extremely.

In a combustion control apparatus of engine according to the fourth aspect of the present invention, the latter-injection control means performs the latter-injection by the fuel injector so that the combustion of the latter-injection can begin within a certain range beginning at around a certain point, which is when the heat release rate by the combustion of the main-injection fuel becomes about zero, and ending at another point, which is a predetermined crank angle after the certain point.

Accordingly, the injection timing of the latter-injection is controlled so that the combustion begins based on the completion timing of the combustion of the main-injected fuel, and thereby the function and effect of the above-described third aspect of the present invention can be achieved sufficiently. Here, the range, beginning at around a certain point which is when the heat release rate by the combustion of the main-injection fuel becomes about zero and ending at another point which is a predetermined crank angle after the certain point, means that it is not required that the combustion of the latter-injected fuel begins accurately at the timing when the heat generation ends (namely, at the timing of combustion completion). Specifically, it is preferable that the combustion by latter-injection begins within a certain range, for example, a crank angle of ±5° or ±3°, which is as a center of the point when the heat release rate becomes about zero. Or, the combustion by the latter-injection may begin a little after that.

In a combustion control apparatus of engine according to the fifth aspect of the present invention, the latter-injection control means controls the timing of the latter-injection within a range of about 10° CA to about 60° CA after the top dead center of the compression stroke of cylinder. The latter-injection within the range can provide the same function and effect as the third aspect of the present invention.

In a combustion control apparatus of engine according to the sixth aspect of the present invention, it farther comprises EGR estimation means for estimating an actual EGR value of the engine, wherein the latter-injection control means is constituted so as to perform the latter-injection by the fuel injector based on the EGR value estimated by the EGR estimation means when the EGR value is within a predetermined range between the first and second predetermined values.

Namely, the fuel latter-injected after the expansion stroke of cylinder as described above forms a combustion state having relatively slow combustion and also a cycle efficiency of engine becomes low. Accordingly, in general the fuel consumption tends to become worse when the latter-injection is performed. According to the present invention, the latter-injection is performed only when it is estimated based on the EGR value that the EGR value is within a predetermined range where a large amount of smoke is produced, at the transition of the engine condition. Thus, it can reduce smoke and suppress such deterioration of fuel consumption as well.

In a combustion control apparatus of engine according to the seventh aspect of the present invention, it further comprises main-injection amount compensation means for reducing the amount of the main-injection fuel so as to offset an increase of torque by the latter-injection when the latter-injection control means performs the latter-injection.

Accordingly, engine torque fluctuation caused by the latter-injection can be suppressed to provide good driving feelings. Specifically, it may be constituted that, for example, the more the amount of the latter-injection is and/or the closer to the top dead center the beginning timing of the latter-injection is, the less the fuel amount of the main-injection fuel is.

In a combustion control apparatus of engine according to the eighth aspect of the present invention, the latter-injection control means controls the amount of the latter-injection fuel, when the engine operating condition transfers from the second engine operating condition to the first engine operating condition and at least after a mode of the main-injection is changed, in such a manner that the greater a difference between a target EGR value and an actual EGR value after the transition of the engine operating condition is, the greater the ratio of the fuel amount of the latter-injection fuel with respect to that of the main-injection is.

Namely, as described above, when the engine operating condition transfers from the second engine operating condition to the first engine operating condition, the mode of the main-injection fuel is changed to its early injection when the EGR ratio is not sufficiently high, and thereby the fuel is self-ignited at the too-early timing. As a result, it may be concerned that considerably large noise of combustion is produced and the exhaust gas condition deteriorates. Here, the greater the difference of the EGR ratio, namely, the difference between a target EGR value and an actual EGR value after the transition of the engine operating condition is, the greater these problems become. In the present invention, however, it is constituted that the greater the difference of the EGR values is, the greater the ratio of fuel amount of the latter-injection fuel with respect to that of the main-injection is. Accordingly, it can be suppressed by reducing the amount of fuel injected at the early timing as much as possible that the fuel is ignited at the too-early timing. Further, even if the early ignition occurs, such noise and deterioration of exhaust gas condition that are caused by it can be suppressed.

In a combustion control apparatus of engine according to the first aspect of the present invention, it is preferable that the first predetermined value of the EGR value is set within a range of about 50 to about 60% of an EGR ratio, while the second predetermined value of the EGR value is set within a range of about 30 to about 40% of the EGR ratio (the ninth aspect of the present invention). Accordingly, good combustion with less NOx and smoke can be achieved at the first and second engine operating condition, respectively.

In a combustion control apparatus of engine according to the first aspect of the present invention, it may be constituted that the latter-injection control means controls the amount of the latter-injection fuel by the fuel injector when the engine operating condition transfers from the second engine operating condition to the first engine operating condition, in such a manner that the greater a target torque of engine is, the more the latter-injection fuel is (the tenth aspect of the present invention). Further, it may be constituted that the latter-injection control means controls the amount of the latter-injection fuel by the fuel injector when the engine operating condition transfers from the second engine operating condition to the first engine operating condition, in such a manner that the greater a engine speed is, the more the latter-injection fuel is (the eleventh aspect of the present invention). Further, it may be constituted that the latter-injection control means controls the timing of the latter-injection by the fuel injector according to a target torque of engine and an engine speed when the engine operating condition transfers from the second engine operating condition to the first engine operating condition, in such a manner that the greater the target torque of engine is and/or the lower the engine speed is, the more advanced the timing is (the twelfth aspect of the present invention).

In a combustion control apparatus of engine according to the third aspect of the present invention, it may further comprise a map in which the timing of the latter-injection is preset correlating the engine operating condition, based on experiments and the like, in consideration of an ignition-delay time of the latter-ignition fuel so that the latter-injection fuel can begin to burn at the point of the combustion completion of the main-injection fuel. The latter-injection control means may control the timing of the latter-injection in reference to this map according to the engine operating condition (the thirteenth aspect of the present invention).

In a combustion control apparatus of engine according to the sixth aspect of the present invention, the latter-injection control means may be constituted so that the latter-injection control means can begin the latter-injection by the fuel injector when the EGR value estimated by the EGR estimation means becomes a first middle value between the first and second predetermined values when the engine operating condition transfers from the first engine operating condition to the second engine operating condition, while the latter-injection control means can begin the latter-injection when the EGR value estimated by the EGR estimation means becomes a second middle value different from the first middle value when the engine operating condition transfers from the second engine operating condition to the first engine operating condition (the fourteenth aspect of the present invention). Thus, stability of its control can be obtained.

In a combustion control apparatus of engine according to the seventh aspect of the present invention, it may be constituted that, for example, the more the amount of latter-injection fuel is, the less the amount of main-injection fuel compensated by the main-injection amount compensation means is (the fifteenth aspect of the present invention). Further, it may be constituted that the more the timing of the latter-injection is advanced, the less the amount of main-injection fuel compensated by the main-injection amount compensation means is (the sixteenth aspect of the present invention).

The seventeenth aspect of the present invention is premised on a combustion control apparatus of a diesel engine, comprising a fuel injector projecting into a combustion chamber of an engine cylinder, an exhaust gas recirculation amount adjusting valve adjusting the amount of recirculated exhaust gas to the combustion chamber, a sensor for sensing an engine speed, a sensor for sensing the amount of intake air of engine, a sensor for sensing the amount of accelerator operation, and a control unit for controlling the fuel injector and said exhaust gas recirculation amount adjusting valve at least according to signals from the sensors.

Further, the control unit comprises operating area determination section that determines at least according to the engine speed and the accelerator operation amount whether the engine operation is at a first engine operating area where the engine operation is relatively at low engine load and low engine speed or a second engine operating area where the engine operation is relatively at high engine load and/or high engine speed, main-injection control section that controls said fuel injector, so that the fuel injector injects the fuel during the intake stroke and/or the compression stroke of cylinder at the first engine operating area, while so that the fuel injector injects the fuel at the timing which is delayed from the timing of the first operating area at the second engine operating area, exhaust gas recirculation control section that controls the exhaust gas recirculation amount adjusting valve, in which an EGR value relating to the amount of recirculated exhaust gas at the first engine operating area is larger than a first predetermined value, while the EGR value at the second engine operating area is smaller than a second predetermined value which is smaller than the first predetermined value, latter-injection control section that performs a latter-injection when the engine operation transfers from one of the first and second engine operating areas to the other thereof, wherein the latter-injection fuel is injected by the fuel injector after the main-injection fuel injected into the combustion chamber by controlling the fuel injector by the main-injection control section begins to burn and when a heat release rate by the combustion of the main-injection fuel becomes less than a predetermined value, and main-injection amount compensation section that reduces the amount of the main-injection fuel so as to offset an increase of engine torque by the latter-injection when the latter-injection control section performs the latter-injection.

According to the above-described structure, the same function and effect as the first aspect of the present invention can be achieved.

As described above, according to the first aspect of the present invention, in which a combustion state is changeable between the first combustion state having relatively the greater rate of pre-mixed combustion and the second combustion state having relatively the greater rate of diffusion combustion according to the engine operating condition, when the combustion state transfers from one of the first and second combustion states to the other thereof, further fuel is latter-injected after the main-injection begins at around the top dead center of compression of cylinder, so that the latter-injected fuel can burns smoke in exhaust gas again and thereby an transient increase of smoke can be suppressed.

According to the third aspect of the present invention, the latter-injection is performed after the heat release rate by the combustion of the main-injection fuel becomes less than the predetermined value. Thus, the smoke that has been already produced can be burned again efficiently without producing further smoke by the combustion of the main-injected fuel, and further producing smoke by the combustion of the latter-injected fuel can be avoided. Accordingly, the concentration of smoke in exhaust gas can be decreased extremely.

According to the sixth aspect of the present invention, the latter-injection is performed only when it is necessary based on a state of actual exhaust gas recirculation at the transition of the engine operating condition. Thus, deterioration of fuel consumption can be suppressed with reducing smoke.

According to the seventh aspect of the present invention, the amount of the main-injection fuel is reduced so as to offset the increase of torque by the latter-injection, and thus good driving feelings can be obtained.

According to the eighth aspect of the present invention, when the engine operating condition transfers from the second engine operating condition to the first engine operating condition, the greater the difference of the EGR values is, the greater the ratio of fuel amount of the latter-injection fuel with respect to that of the main-injection is. Thus, it can be suppressed that the main-injected fuel is ignited at the too-early timing, and also noise and deterioration of exhaust gas condition and the like that are caused by it can be suppressed.

According to the fourteenth aspect of the present invention, the timing of beginning the latter-injection is differed between when the engine operating condition transfers from the first engine operating condition to the second engine operating condition and when the engine operating condition transfers from the second engine operating condition to the first engine operating condition. Thus, stability of its control can be obtained.

DETAILED DESCRIPTION OF THE INVENTION

Hereinafter, embodiments of the present invention will be described with reference to the accompanying drawings.
Embodiment 1

Figure 1:
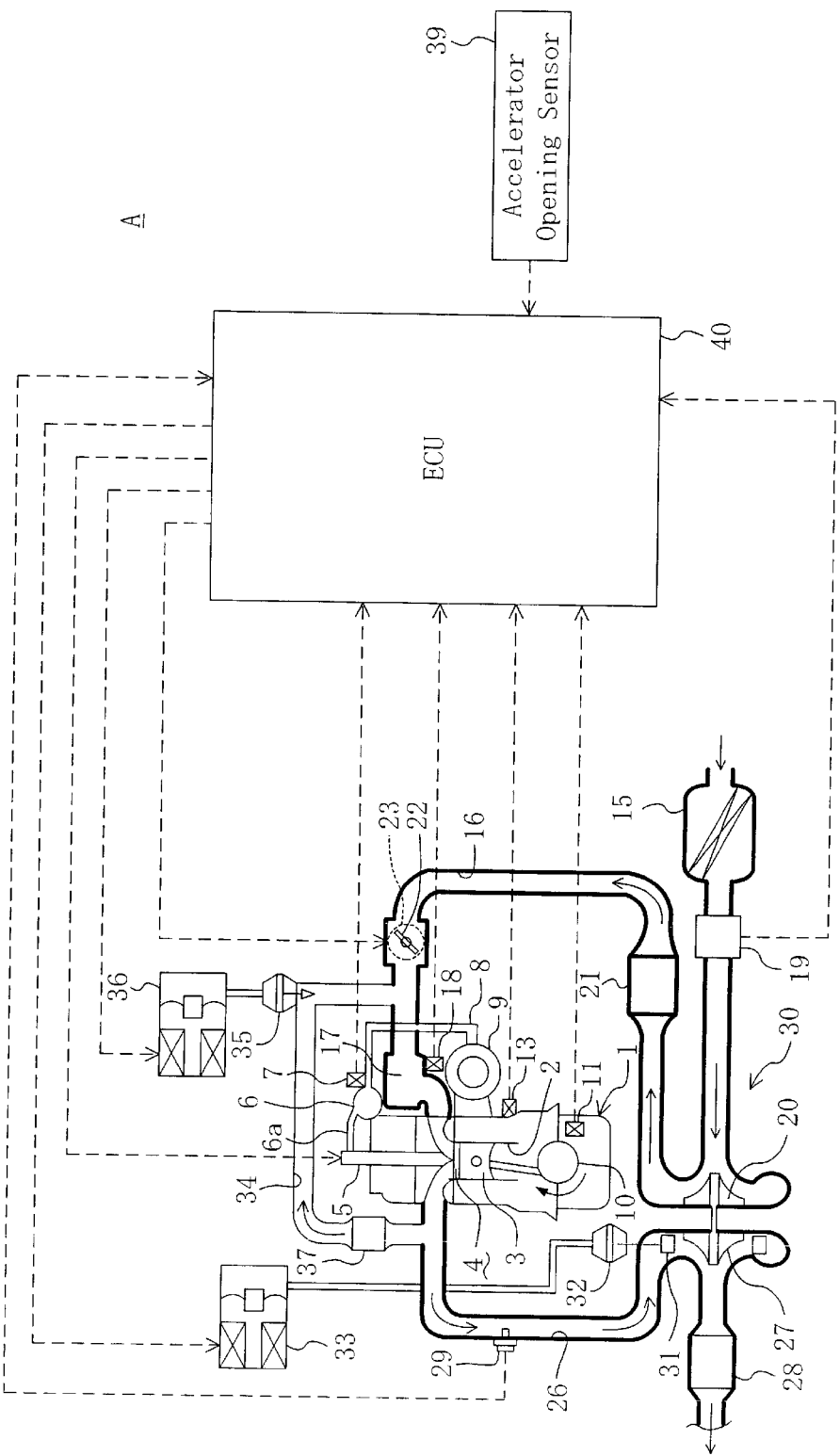
FIG. 1 is an entire structure diagram of a combustion control apparatus of engine according to the first embodiment of the present invention.

FIG. 1 shows an exemplified combustion control apparatus of diesel engines A according to an embodiment of the present invention. A reference numeral 1 denotes a diesel engine installed in a vehicle. The engine 1 comprises a plurality of cylinders 2, 2, . . . (only one cylinder is shown). A reciprocating piston 3 is inserted in each cylinder 2, and thereby a combustion chamber 4 is formed in each cylinder. An injector 5 (fuel injector) is provided at a ceiling of the combustion chamber 4, and a fuel with high pressure is injected directly into the combustion chamber 4 through injection ports formed at an end of the injector. Meanwhile, a base of the injector 5 at each cylinder 2 is coupled to a common fuel delivery pipe 6 (common rail) by respective branch pipes 6a, 6a, . . . (only one is shown). The common rail 6 is coupled to a high-pressure supply pump 9 by a fuel supply pipe 8 and accumulates the fuel from the supply pump 9 at a high pressure state so as to supply the fuel to the injectors 5, 5, . . . at any timing. A fuel pressure sensor 7 to sense its internal fuel pressure (common rail pressure) is provided.

The high-pressure supply pump 9 is coupled to a fuel supply system, not shown in any drawing, and connected drivingly to a crank shaft 10 by a cogged belt or the like. The supply pump 9 supplies the fuel to the common rail 6 and adjusts an amount of fuel supply to the common rail 6 by returning part of the fuel to the fuel supply system through a solenoid valve. An opening of the solenoid valve is controlled by an ECU 40, which will be described below, according to a sensed value by the fuel pressure sensor 7. Thus, the common rail pressure is controlled according to operating condition of the engine 1.

Further, a valve driving mechanism for opening and closing an intake valve and an exhaust valve, which is not shown in any drawing, is provided at an upper portion of the engine 1. Close timings of the intake and exhaust valves of each cylinder 2 are set so that an actual compression ratio of the cylinder 2 is about 17 or less. Here, the actual compression ratio means a substantial compression ratio when a gas introduced into the cylinder 2 until the intake valve closes is compressed at the top dead center of compression of cylinder. Accordingly, that is different from a geometrical compression ratio of the combustion chamber 4, and approximately equivalent to a ratio of a combustion chamber volume at the top dead center of compression with respect to that when the intake valve closes. Meanwhile, a crank angle sensor 11 to sense a rotational angle of the crankshaft 10 and an engine coolant temperature sensor 13 to sense a coolant temperature are provided at a lower portion of the engine 1. The crank angle sensor 11 comprises a sensed plate, which is disposed at a crank shaft end, and a solenoid pick-up, which is disposed around and facing to the periphery of the sensed plate, which is not shown in detail in any drawing. The sensor 11 generates a pulse signal whenever projections that are formed with an equal distance around the periphery of the sensed plate pass the pick-up.

An intake air passage 16 to supply an air filtered by an air cleaner 15 (a fresh air) to the combustion chamber 4 of each cylinder 2 is coupled to a side surface of one side of the engine 1 (right side in the drawing). The intake air passage 16 is provided with a surge tank 17 at an end of its down stream, and each passage branched off from the surge tank 17 is connected to the combustion chamber 4 of each cylinder 2 through each intake port. An intake air pressure sensor 18 to sense a condition of intake air pressure is provided at the surge tank 17.

Further, the intake air passage 16 is provided with, in order from the upper stream to the downstream, a hot film-type airflow sensor 19 to sense an airflow amount introduced into the engine 1 from the outside, a compressor 20 driven by a turbine described below to compress an intake air, an intercooler 21 to cool the compressed air by the compressor 20, and an intake air throttle valve 22 made of a butterfly valve. The intake air throttle valve 22 is controlled so as to take any opening position between a full close and a full open by a rotation of its valve axis connected to a stepping motor 23. Here, it is constituted that some gap between the intake air throttle valve 22 and a peripheral wall of the intake air passage 16 exists even if the valve 22 is fully closed, so that some amount of air can be flew down therebetween.

Meanwhile, an exhaust gas passage 26 to exhaust a burned gas (exhaust gas) from the combustion chamber 4 of each cylinder 2 is coupled to a side surface of the opposite side of the engine 1 (left side in the drawing). The exhaust gas passage 26 branches off for each cylinder 2 at its upstream end to form an exhaust manifold connected to the combustion chamber 4 through each exhaust port. The exhaust gas passage 26 downstream of the exhaust manifold is provided with, in order from the upper stream to the downstream, a linear O2 sensor 29 to sense oxygen concentration in an exhaust gas, a turbine 27 rotated by an exhaust gas flow, and a catalyst converter 28 capable of purifying noxious constituents in the exhaust gas (HC, CO, NOx, smoke and the like).

A turbo charger 30 formed of the turbine 27 and the compressor 20 in the intake air passage 16, in the present embodiment, is a variable turbo charger (Variable Geometry Turbo-supercharger: hereinafter, referred to as VGT) that controls an area of cross section of the exhaust gas passage to the turbine 27 by movable flaps 31, 31, . . . . The flaps 31, 31, . . . are coupled drivingly to a diaphragm 32 through respective linkages, not shown in any drawing respectively, and the rotational positions of the flaps 31, 31, . . . can be controlled by adjusting a magnitude of negative pressure acted on the diaphragm 32 through a solenoid valve for negative pressure control 33. Here, other turbo chargers than the VGT may be used.

An upper end of an exhaust gas recirculation passage (hereinafter, referred to as EGR passage) 34 for recirculating a part of the exhaust gas to the intake air side is connected the exhaust gas passage 26 so as to open at a portion of the exhaust gas passage upstream from the turbine 27. A lower end of the EGR passage 34 is connected to the intake air passage 16 at a portion between the intake air throttle valve 22 and the surge tank 17 so as to recirculate a part of the exhaust gas derived from the exhaust gas passage 26 to the intake air passage 16. Further, a EGR cooler 37 to cool the exhaust gas flew down and a exhaust gas recirculation amount adjusting valve (hereinafter, referred to as EGR valve) 35 capable of adjusting its opening are provided in the EGR passage 34. The EGR valve 35, in the present embodiment, is a type responsible to a negative pressure and can lineally adjust the cross section of the EGR passage 34 by adjusting a magnitude of negative pressure acted on the diaphragm through a solenoid valve 36 in the same way as the flaps 31, 31, . . . of the above-described VGT 30, so that the amount of recirculated exhaust gas to the intake air passage 16 can be adjusted.

The above-described injector 5, high-pressure supply pump 9, intake air throttle valve 22, VGT 30, EGR valve 35 and the like are operated by respective control signals from the control unit (Electronic Control Unit: hereinafter, referred to as ECU) 40. Meanwhile, respective output signals of the above-described fuel pressure sensor 7, crank angle sensor 11, engine coolant temperature sensor 13, intake air pressure sensor 18, air flow sensor 19, linier O2 sensor 29 and the like are inputted to the ECU 40, and further an output signal of a accelerator opening sensor 39 to sense the amount of operation of an accelerator (accelerator opening), which is not shown in any drawing, is inputted to the ECU 40.

Abstract of Combustion Control of Engine

A basic control of the engine 1 by the ECU 40 is to determine a basic target fuel injection amount according to the accelerator opening mainly, control an injection amount, an injection timing, an injection time and the like by controlling an operation of the injector 5, and control a fuel pressure, namely, an injection pressure of fuel by controlling an operation of the high-pressure supply pump 9. In addition, a recirculation ratio of the exhaust gas to the combustion chamber 4 is controlled by controlling respective openings of the intake air throttle valve 2 and the EGR valve 35, and further a supercharge efficiency of the intake air is improved by controlling operations of the flaps 31, 31, . . . of the VGT 30 (VGT control).

Figure 2:
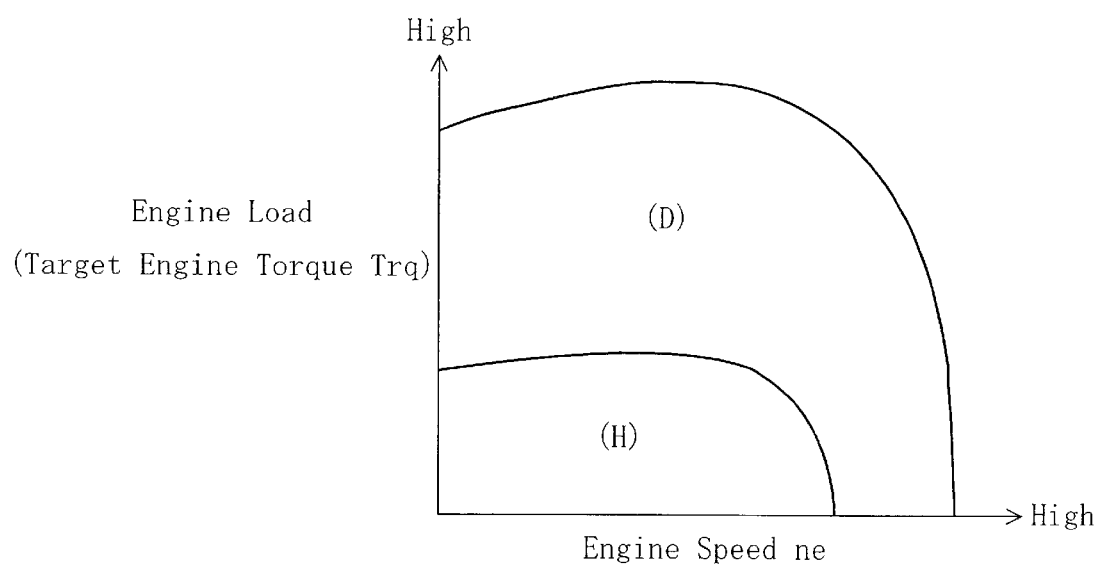
FIG. 2 is a diagram for showing an exemplified control map to change a combustion mode of engine.

Specifically, for example as shown in a control map (combustion mode map) of FIG. 2, a pre-mixed combustion area (H) is set at relatively low engine load part in a whole engine operating area during an operation state of warmed-up engine 1 (first engine operating condition). In this area, as shown in exemplified I to III of FIG. 3, the injector 5 injects a fuel during the middle period through the latter period of the compression stroke of the cylinder 2 to make the mixture as more homogeneous as possible in advance, and the mixture is burned by a self-ignition (pre-mixed combustion mode). This combustion mode was conventionally referred to as pre-mixed compression ignition combustion, and by controlling the injection timing of the fuel properly when a fuel injection amount per one cycle of the cylinder is not so much, the fuel can disperse appropriately and widely and mix sufficiently with an air, and then most of fuel can be burned at one time by its self-ignition with substantially the same ignition-delay time. Hereinafter, although such combustion state may be referred to as pre-mixed combustion simply in the present embodiment, this means a first combustion state where the rate of pre-mixed combustion is greater than that of diffusion combustion.

Figure 3:
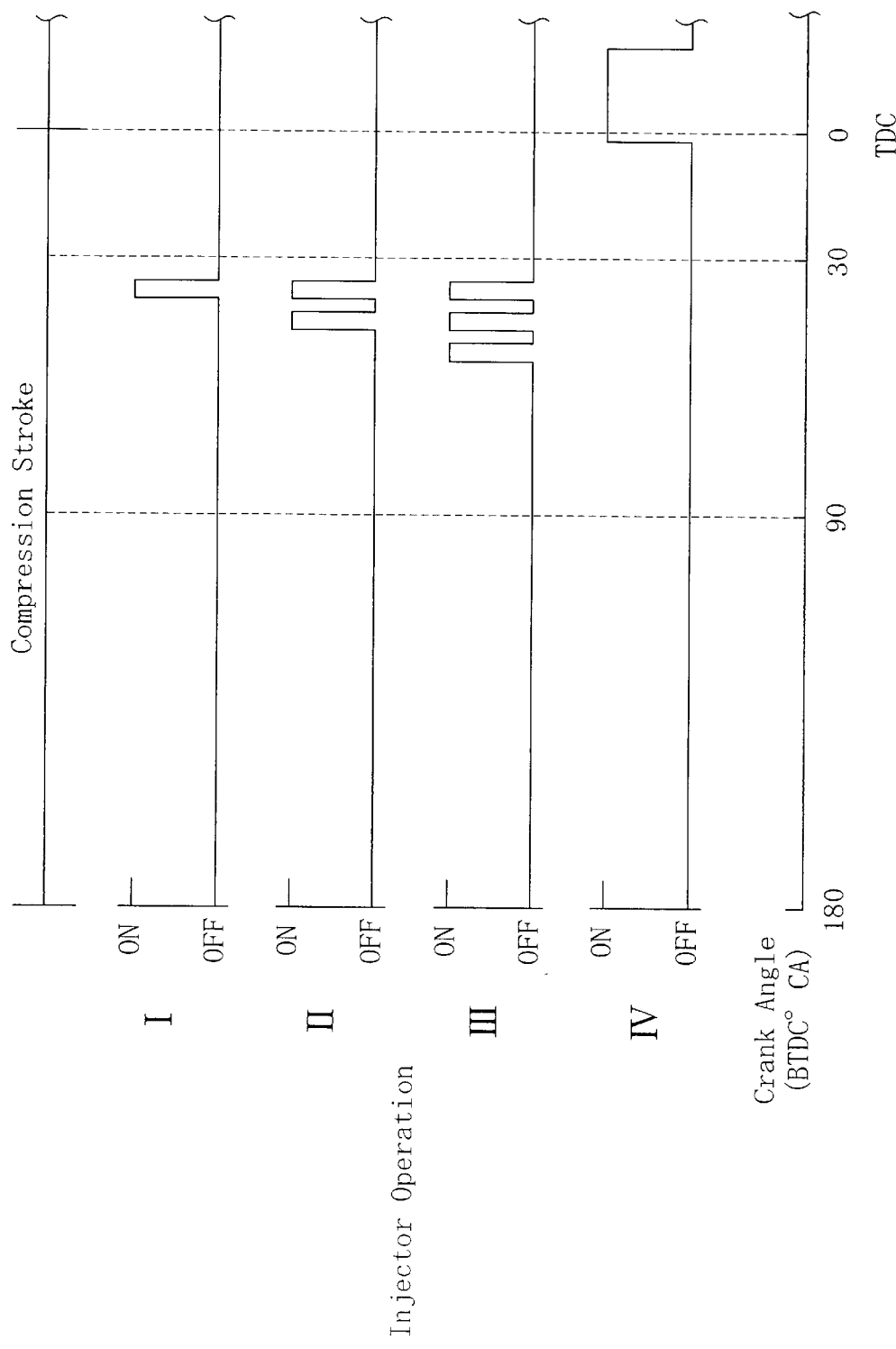
FIG. 3 is an explanatory diagram for showing schematically a state of injection operation by an injector.

Here, although a fuel injection by the injector 5 is performed at one time as shown in I of FIG. 3 schematically, the fuel injection may be performed at two or three times with a split injection as shown in II or III of the figure, or at four times and more with a split injection, not shown in any figure. This is based on the following. When injecting the fuel into the combustion chamber 4 at relatively early timing during the middle period through the latter period of the compression stroke of the cylinder 2, a state of gas pressure or density in the combustion chamber 4 is relatively low compared with a fuel injection at the end of the compression stroke. Accordingly, the fuel is injected into a relatively low state of gas in the cylinder, and thus a penetrating force of its fuel spray becomes large relatively. Therefore, it can be suppressed for the fuel to be attached to an inner surface of the cylinder 2 by reducing the penetrating force of fuel injection with such split injections to the contrary.

Further, a large amount of exhaust gas is recirculated through the EGR passage 34 to the intake air passage 16 by opening the EGR valve 35 widely relatively at the above-described pre-mixed combustion mode. Accordingly, a large amount of inert exhaust gas having large thermal capacity compared with fresh air, namely, fresh air supplied from the out side is mixed, and, in addition, fuel drops and fuel vapor are mixed with the recirculated gas. Thereby, the thermal capacity of the pre-mixed gas itself becomes large and density of fuel and oxygen in the pre-mixed gas becomes small relatively, and the timing of self-ignition of the pre-mixed gas can be delayed. As a result, it becomes possible that the mixture is ignited and burned at an appropriate timing of near the top dead center of compression of cylinder (TDC), mixing the air, the recirculated exhaust gas and the fuel sufficiently.

Figure 4:
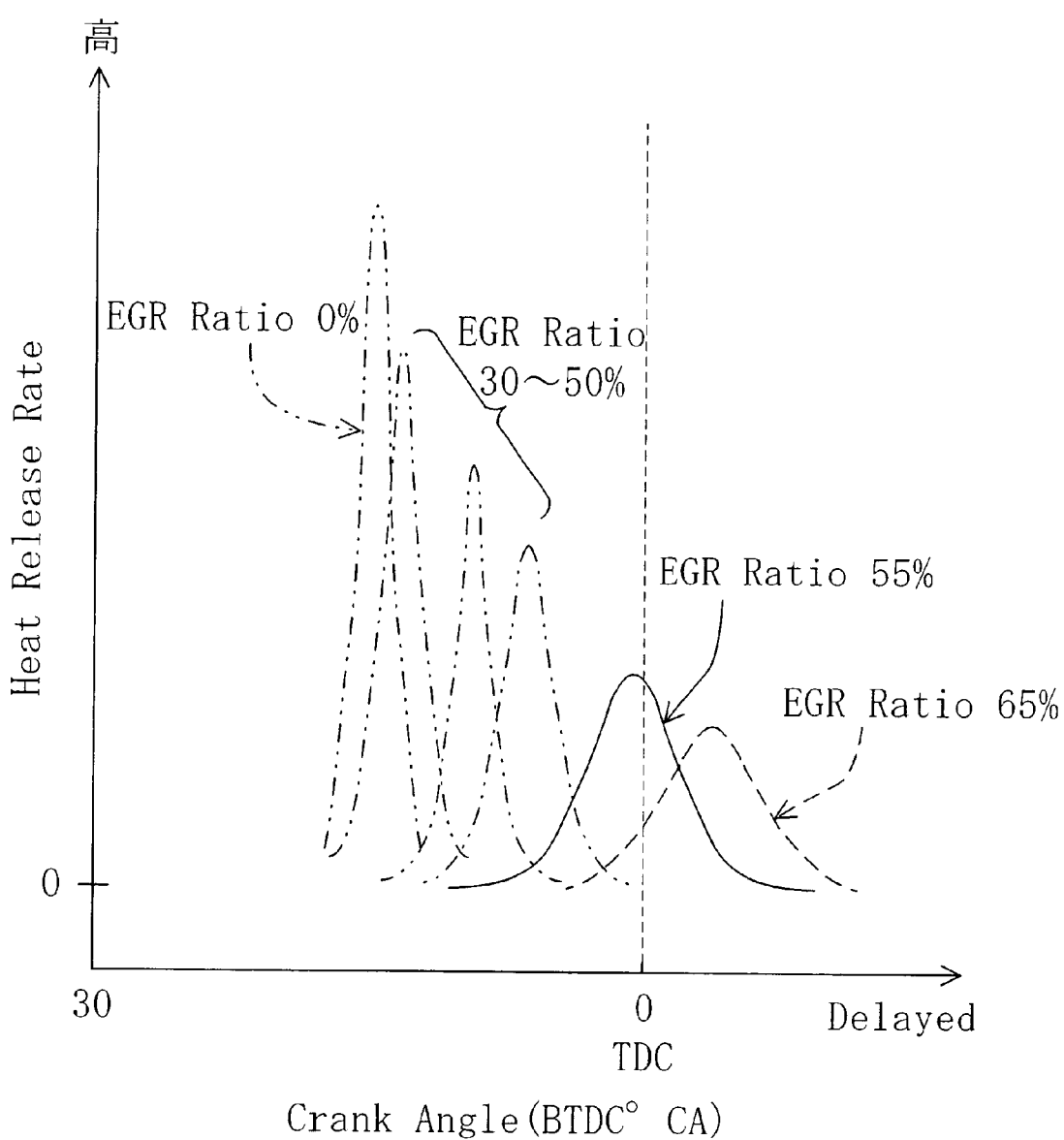
FIG. 4 is a graph for showing a change of heat release rate with respect to a change of EGR ratio.

More specifically, a graph of FIG. 4 is results of an experiment showing how a pattern of a heat release changed according to an EGR ratio (a ratio of recirculated exhaust gas amount with respect to a total amount of fresh air and recirculated exhaust gas) when the fuel was injected at a certain crank angle (for example, BTDC 30° CA) before the top dead center of compression (BTDC) at a low load area of engine 1 and burned. As shown in imaginary lines of the drawing, it began to burn at considerably advanced timing from TDC when the EGR ratio was low, and its heat release pattern became too early one having low cycle efficiency. Meanwhile, the lager the EGR ratio was, the more advanced the ignition timing was, and when the EGR ratio was about 55%, a peak of its heat release occurred approximately at TDC having high cycle efficiency.

Further, according to the graph of the FIG. 4, it is noticed that a peak of the heat release with a low EGR ratio became considerably high, and it was a strong combustion with its high combustion speed. In this situation, more NOx was produced by combustion and extremely large combustion noise was generated. Meanwhile, the larger the EGR ratio was, the slower its changing rate of heat release was, and its peak reduced. This may be because density of fuel and air became small due to the many amount of exhaust gas in the mixture, as described above, and a heat by the combustion was absorbed by the exhaust gas. Also, production of NOx may be suppressed greatly at such a low-temperature combustion with a mild heat release.

Figure 5:
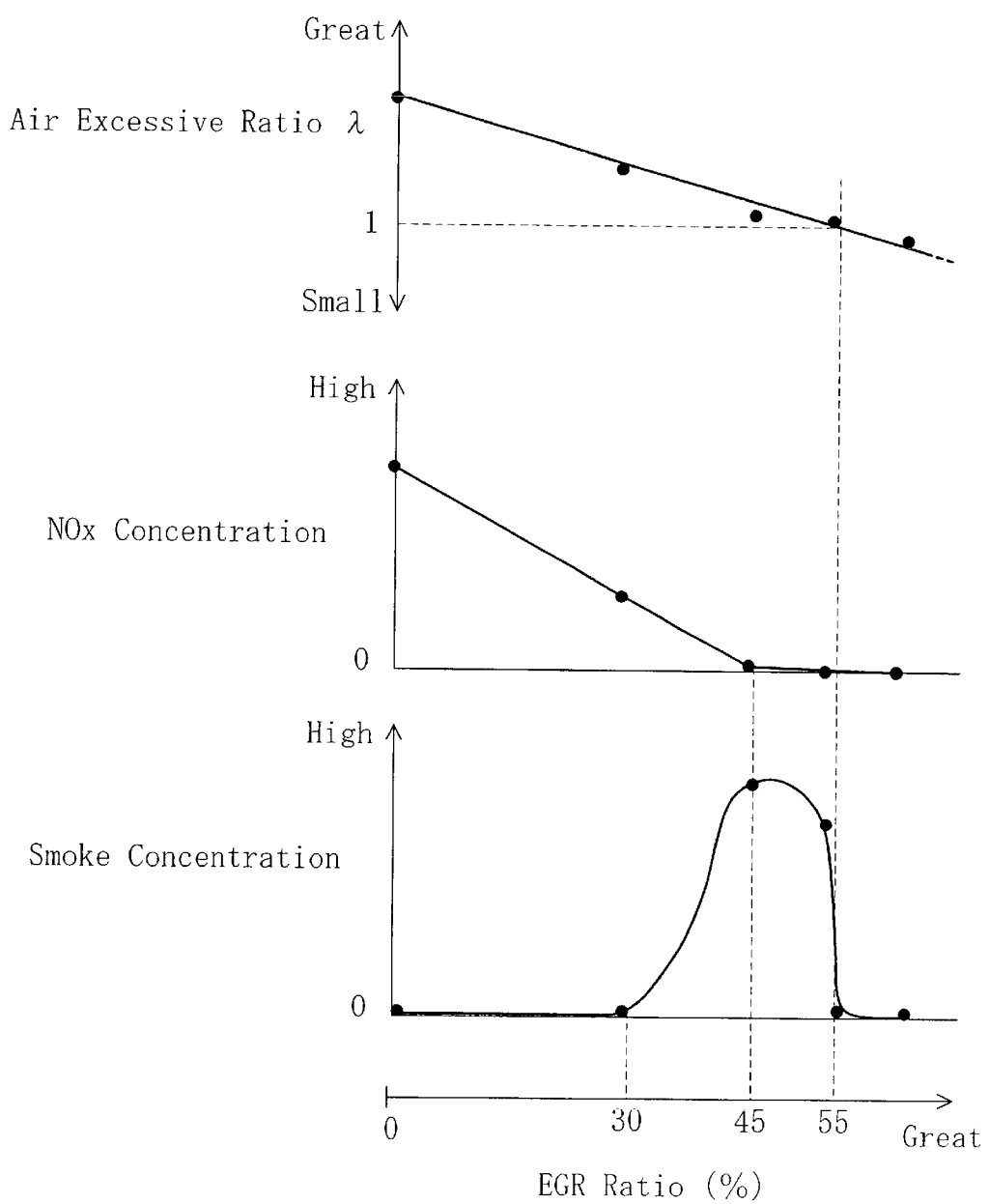
FIG. 5 is a graph for showing changes of air excessive ratio, NOx concentration and smoke concentration respectively with respect to a change of EGR ratio.

A graph of FIG. 5 shows changes of air excessive ratio λ of the combustion chamber 4, NOx concentration and smoke concentration in the exhaust gas respectively with respect to a change of EGR ratio in the above-described experiment. According to the graph, when the EGR ratio was about 0% in this experimental condition, the air excessive ratio λ was large, λ≈2.7, and according to an increase of the EGR ratio from this state, the air excessive ratio λ decreased gradually. When the EGR ratio was about 55 to 60%, the air excessive ratio λ became about 1. In this way, although the average of the air excessive ratio λ of the mixture approached to 1 with an increase of the recirculation ratio of exhaust gas, a combustion may not become strong even if the ratio of air and fuel was about λ=1. This may be because density of fuel or air itself did not increase so much due to an existence of many exhaust gas in the mixture. Accordingly, NOx concentration in the exhaust gas may decrease gradually with an increase of the EGR ratio, and finally little NOx may be produced when the EGR ratio was about 45% and more.

Meanwhile, with respect to production of smoke, little smoke could not found when the EGR ratio was about 0 to 30%. Although smoke concentration increased greatly when the EGR ratio exceeded about 30%, it reduced again when the EGR ratio exceeded about 50% and became about 0 when the EGR ratio was over about 55%. This may be because an ignition-delay time was not so long when the EGR ratio was low, and thereby the ignition happened with an insufficient mixing state of fuel spray and intake air. Thus, diffusion combustion may happen following a strong pre-mixed combustion. In this combustion state, little smoke seems to be produced because excessive oxygen existed compared to fuel in the intake air. Further, oxygen in the intake air may decrease with a gradual increase of the EGR ratio, and this may deteriorate a combustion state to increase smoke produced greatly. However, when the EGR ratio was over about 55%, as described above, the combustion may happen with sufficient mixture of air, recirculated exhaust gas and fuel. As a result, a state may be made where little smoke was produced.

To sum up, in the present embodiment, when the engine 1 runs in the pre-mixed combustion area (H) at low engine load, low temperature combustion with little NOx and smoke produced can be achieved by injecting fuel at relatively early timing and controlling the opening of the EGR valve 35 so that the EGR ratio is over a predetermined value (first predetermined value: about 55% in the above-described experimental sample, preferably about 50 to 60% in general).

Meanwhile, as shown in the control map of FIG. 2, when the engine 1 runs in the other operating area (D) (second operating state) at high engine speed and/or high engine load than the above pre-mixed combustion area (H), fuel is injected at around the TDC of the cylinder 2 mainly by the injector 5, as shown in exemplified IV of FIG. 3, to make a conventional diesel combustion state (a second combustion state) where the rate of diffusion combustion is greater than that of pre-mixed combustion (diesel combustion mode). In this case, other fuel injection that is additional and prior to the above fuel injection at around the top dead center of the cylinder 2 may be applied. Most of the fuel spray injected into the combustion chamber 4 with high pressure in this way burns with diffusion combustion following the initial pre-mixed combustion, and thus, hereinafter, this area (H) where the engine 1 runs at the diesel engine mode is referred to as diffusion combustion area.

Figure 6:
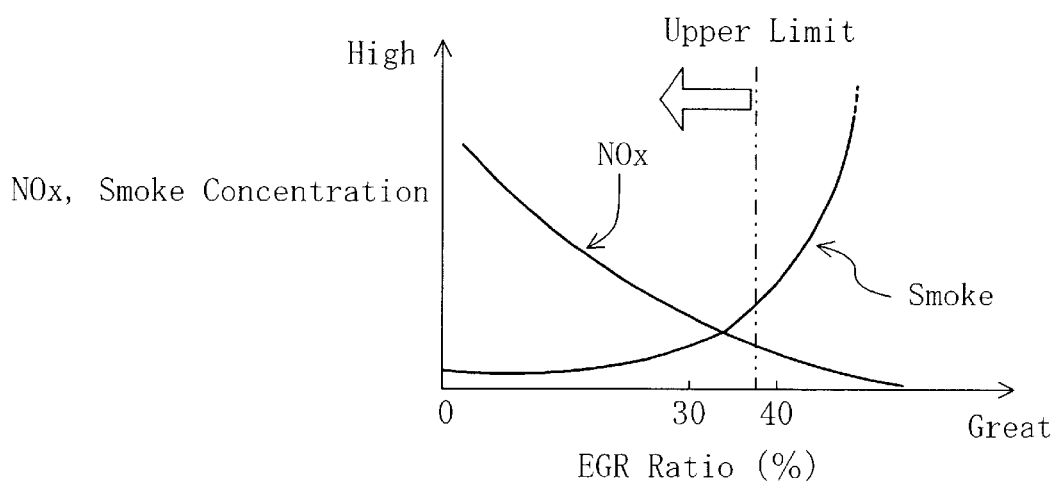
FIG. 6 is a graph for showing changes of NOx concentration and smoke concentration in an exhaust gas respectively with respect to a change of EGR ratio during diesel combustion.

In addition, at this diesel combustion mode (diffusion combustion area (D)), the opening of the EGR valve 35 is controlled to be small compared to the above-described pre-mixed combustion mode so that the EGR ratio may be less than a predetermined value (second predetermined value). This EGR ratio can be set at an appropriate value so as to suppress NOx production as much as possible within a scope that may not cause an increase of smoke production in the conventional diesel combustion having diffusion combustion mainly. Specifically, as shown in an exemplified graph of FIG. 6, it is preferable that an upper limit of the EGR ratio at the diffusion combustion area (D), for example, is set at about 30 to 40%. Further, because it is necessary for more fresh air to be supplied to the cylinder 2 when the engine 1 runs at higher engine load, the EGR ratio becomes low at higher engine load operation. Also, a pressure of supercharged intake air by the turbo charger 30 becomes high at high engine speed and/or high engine load. Accordingly, the exhaust gas recirculation is not performed substantially.

Control at a Combustion Mode Transition

By the way, as described above, in case that the operation of the engine 1 transfers between the pre-mixed combustion mode and the conventional diesel combustion mode, there is the possibility that the problems of deterioration of exhaust gas condition and big noise arise transitionally at its transition. Namely, as shown in FIG. 7 schematically, a change of smoke concentration with respect to EGR ratios was checked when the operation of the engine 1 was changed between the pre-mixed combustion (shown by solid lines) and the diesel combustion (shown by imaginary lines) at a certain operating condition, for example, at low engine speed and middle engine load. Here, it can be found that the smoke concentration was high in every combustion modes when the EGR ratio was less than the above-described first predetermined value and larger than the second predetermined value.

More specifically, for example, when the operating condition of the engine 1 transfers from the pre-mixed combustion area (H) to the diffusion combustion area (D), a fuel injection mode by the injector 5 is changed from the early injection (pre-mixed combustion) to the injection at around TDC (diesel combustion), and the EGR ratio transfers from the state of more than the above-described first predetermined value to the state of less than the second predetermined value by controlling the opening of the EGR valve 35. Here, a certain time is necessary for the change of the amount of the recirculated exhaust gas. Therefore, if the fuel injection mode is changed at once, the engine 1 is changed to the diesel combustion having the diffusion combustion mainly while the EGR ratio is too large. As a result, as shown by a bold arrow in FIG. 7A, there is the possibility that production of smoke extremely increases.

Figure 8A:
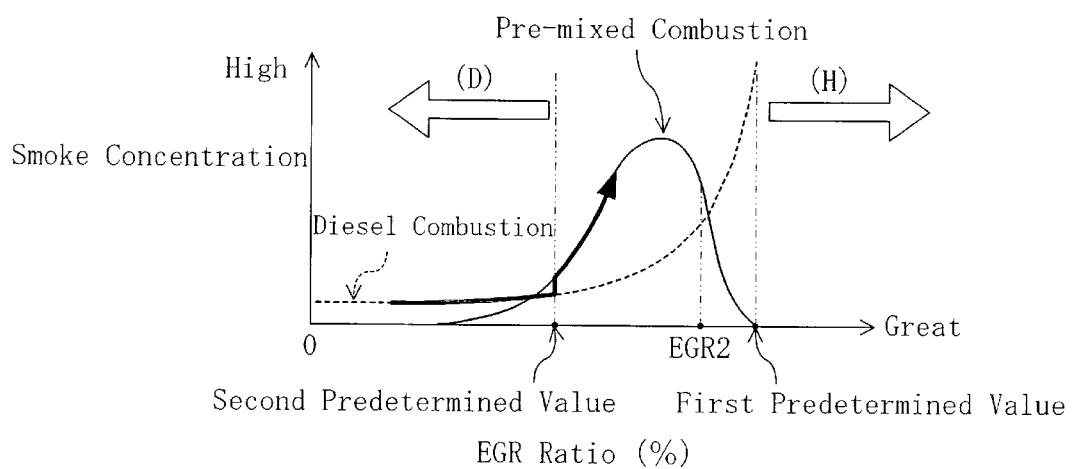
FIGS. 8A and 8B are graphs equivalent to FIGS. 7A and 7B when the combustion mode transfers from the diesel combustion mode to the pre-mixed combustion mode.

To the contrary, when the operating condition of the engine 1 transfers from the diffusion combustion area (D) to the pre-mixed combustion area (H), as shown by an arrow in FIG. 8A, it transfers from the diesel combustion state (broken line) to the pre-mixed combustion state (solid line). Here, a certain time is necessary for the change of the amount of the recirculated exhaust gas as well. Therefore, if the fuel injection mode is changed at once from the injection at around TDC to the early injection, the early injection is performed while the EGR ratio is not large enough. Accordingly, big combustion noise occurs and NOx is produced greatly by rapid combustion with the too-early timing of ignition (see FIG. 4). In addition, there is the possibility that production of smoke increases as shown by bold arrow in the drawing.

For the above-described problems, in the present embodiment of combustion control apparatus A and as a feature of the present invention, a latter-injection by the injector 5 is performed during the expansion stroke of the cylinder 2, following the combustion of fuel by a main-injection (hereinafter, referred to as main-combustion) which is to provide either the pre-mixed combustion or the diesel combustion, when the operation of the engine 1 transfers between the pre-mixed combustion area (H) and the diffusion combustion area (D). Thereby, smoke in the exhaust gas can be reduced.

Figure 7A:
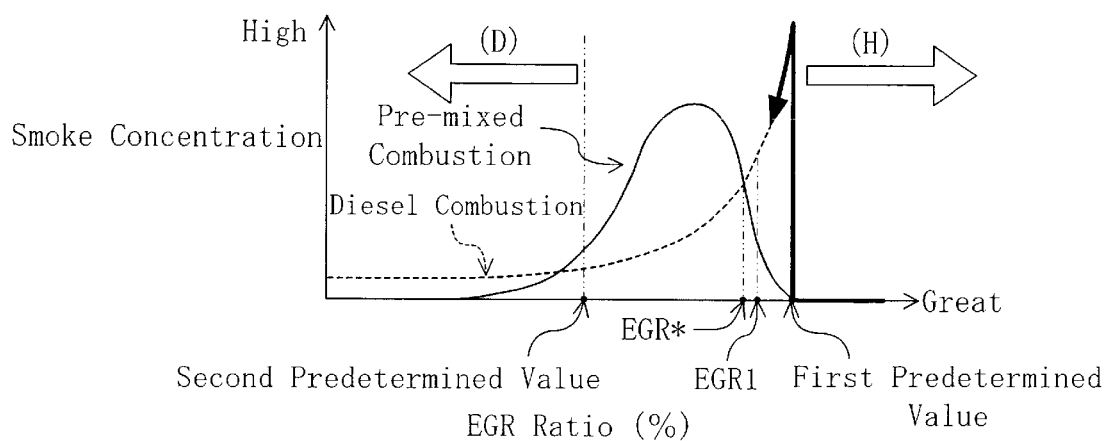
FIGS. 7A and 7B are explanatory diagrams for showing a change of smoke concentration with respect to a change of actual EGR ratio when a combustion mode transfers from a pre-mixed combustion mode to a diesel combustion mode, comparing two states, in which a fuel injection mode is changed at once, while the fuel mode is changed at around a changing EGR ratio.
Figure 7B:
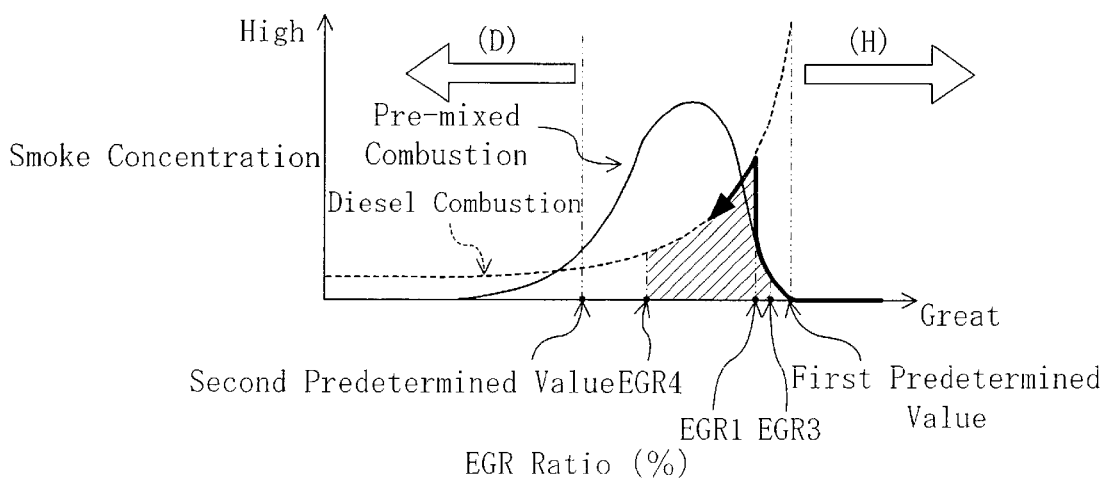

Specifically, at first, changing the fuel injection mode at the combustion mode transition will be described. When the operation of the engine 1 transfers from the premixed combustion area (H) to the diffusion combustion area (D), firstly the opening of the EGR valve 35 is controlled to a small opening to reduce the amount of the recirculated exhaust gas. Then, when the EGR ratio decreases and become less than a predetermined value between the first predetermined value and the second predetermined value, the fuel injection mode is changed from the early injection to the injection at around TDC. Namely, as shown in FIG. 7A, aiming at EGR ratio: EGR* that means a EGR ratio when both amounts of smoke produced at the two combustion states are approximately the same, the fuel injection mode is changed actually when the EGR ratio becomes EGR1 (first middle value) which is a little larger than the EGR*, as shown in FIG. 7B. Thereby, as apparent from a comparison with FIG. 7A, smoke production can be supressed.

Figure 8B:
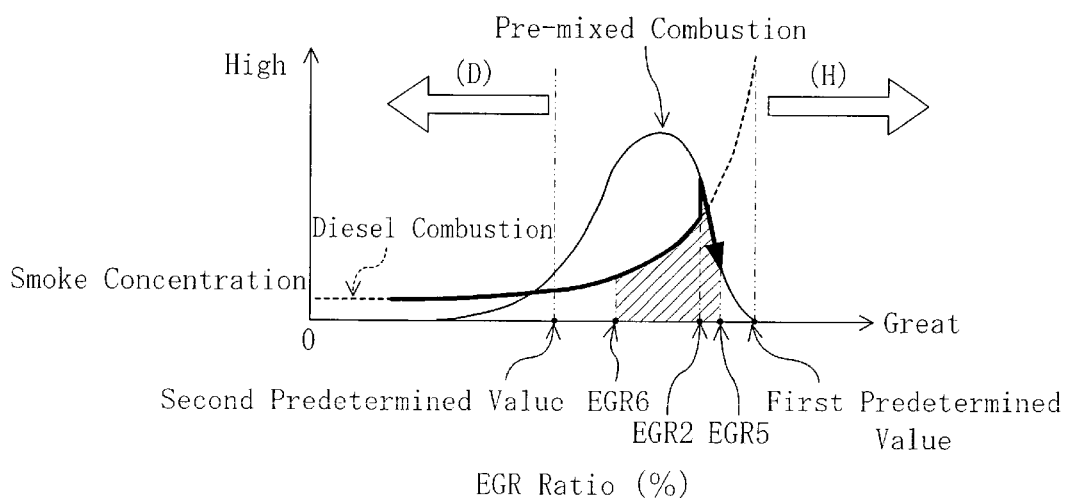

Meanwhile, when the operation of the engine 1 transfers from the diffusion combustion area (D) to the pre-mixed combustion area (H), firstly the opening of the EGR valve 35 is controlled to a large opening to increase the amount of the recirculated exhaust gas. Then, when the EGR ratio increases and become larger than the predetermined value, the fuel injection mode is changed from the injection at around TDC to the early injection. Namely, as shown in FIG. 8B, the fuel injection mode is changed when the EGR ratio becomes EGR2 (second middle value), which is a little smaller than the above EGR*. Thus, as apparent from a comparison with FIG. 8A, smoke production can be suppressed. Further, the too-early ignition of the pre-mixed fuel can be suppressed at this time, and thereby large combustion noise and rapid increase of NOx can be suppressed as well.

Here, the above-described EGR ratio: EGR* should be a standard to determine a proper state of the exhaust gas recirculation into the combustion chamber 4 for changing the fuel injection mode. Hereinafter, this is referred to as changing EGR ratio. Further, actual values of the changing EGR ratio: EGR*, EGR1 and EGR2 are slightly different to one another, which are respectively set for the transition from the pre-mixed combustion area (H) to the diffusion combustion area (D) and the opposite transition from the diffusion combustion area (D) to the pre-mixed combustion area (H). This is to provide stability of the control. However, that is not limited to this, and it may be set in such a manner that EGR*=EGR1=EGR2. Further, in the present embodiment, the values EGR1, EGR2 of the changing EGR ratio: EGR* are set so that production of smoke can be suppressed the most effectively, paying attention to smoke production mainly. However, those may be set so as to reduce the combustion noise the most, not being limited to the above.

By the way, as described above, even if the control of the opening of the EGR valve 35 and the control of changing the fuel injection mode by the injector 5 are done at appropriate timing by correlating the both in response to the EGR delay, it can not be avoided that a state where a transitory increase of smoke happens when the combustion mode transition occurs, as shown by oblique lines of FIGS. 7B and 8B. Accordingly, in the present embodiment, the smoke concentration in the exhaust gas is reduced by effectively burning smoke produced by the main-combustion by a latter-injection of fuel (hereinafter, referred to as follow-up injection, alternatively), which will be described in detail below. Namely, the follow-up injection in the present embodiment means that fuel is injected by the injector 5 at the timing when the heat release rate by the main-combustion becomes less than a predetermined value so that the combustion may begin when the main-combustion ends up mostly (for example, at about ATDC 10 to 30° CA, depending upon the fuel injection amount, the injection timing or the like of the main-injection).

Specifically, it is considered that smoke is produced in the following steps. In general, fuel is pyrolyzed in an excessively rich mixture existing partially during the diffusion combustion of diesel engine and thereby the first particulates are formed. Its polymerization and condensation repeat to form a core of smoke. Then, its growth and condensation in the atmosphere with high temperature produce smoke. Meanwhile, in the case of the pre-mixed combustion, a part of fuel injected by the early injection reaches to the inner wall surface of the cylinder 2 in the form of fuel drops. It is considered that these attached fuel drops cause production of smoke. It is also considered that such growth and condensation of smoke cores during the main-combustion continue until the combustion ends.

Meanwhile, if the follow-up injection is performed so as to conduct the ignition and combustion by the follow-up injection at around the end of the main-combustion like the present embodiment, it may urge the existing smoke to burn again to reduce the amount of smoke, without promoting production of the smoke produced by the main-combustion by the combustion itself of this follow-up injection fuel. Further, it is considered that smoke has become a state in the cylinder 2 where the smoke is easy to react oxygen relatively without being unevenly distributed when the main-combustion ends. Thereby, the follow-up injection fuel can burn smoke again effectively. Further, such relatively late timing injection may not cause production, growth and condensation of the smoke cores by combustion of the follow-up injection fuel itself because the temperature of the cylinder 2 has already become low. Thus, the follow-up injection can reduce smoke concentration in the exhaust gas greatly.

Figure 9:
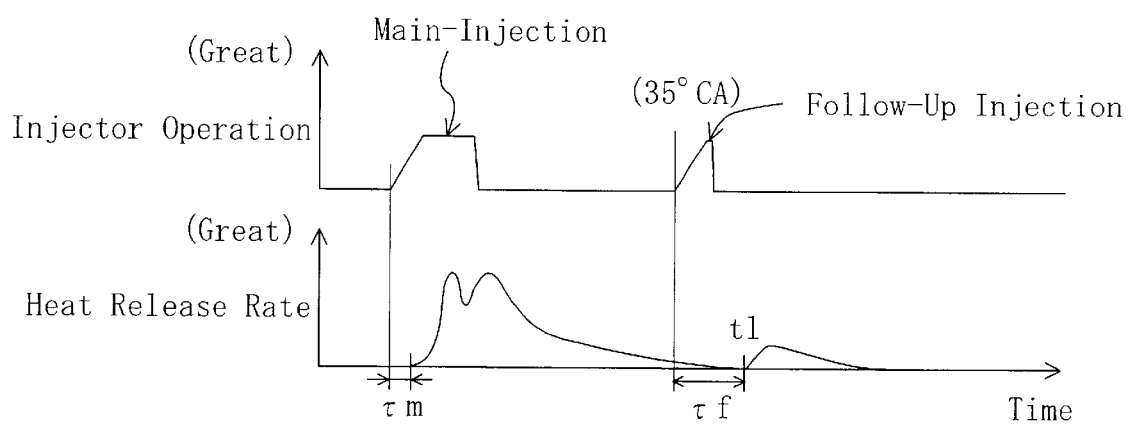
FIG. 9 is a time chart for showing a relationship between injector operation and a heat release rate when a main-injection is a collective injection.

FIG. 9 shows exemplified characteristics of the heat release rate by the follow-up injection, which was a result of an experiment at the middle engine speed and middle engine load where the engine speed: ne is 2000 rpm and the mean effective pressure: Pe is 0.57 MPa, in the case where the main-injection of fuel is a collective injection at around TDC. According to the figure, the heat release rate increased at once in response to the combustion (main-combustion) of the fuel by the main-injection at around TDC, and then decreased gradually according to a completion of the combustion. And, when the follow-up injection began at the timing slightly prior to the timing: t1 when the heat release rate of the main-combustion became about zero, the fuel of the follow-up injection began to burn at the completion timing of the main-combustion: t1, and at this moment, the heat release rate increased again.

Here, in the figure, $\tau m$ means the ignition-delay time of the main-injection fuel, and $\tau f$ means the ignition-delay time of the follow-up injection fuel. The $\tau f$ is dependent upon an engine displacement volume or a fuel injection pressure or the like, and for example, it should be about 0.4 to 0.7 ms for an engine with the displacement volume of 1 to 3 L and the fuel injection pressure of 50 to 200 MPa. The ignition-delay time: $\tau f$ is longer than the ignition-delay time of the main-injection: $\tau m$ (about 0.1 to 0.3 ms), and this is because the latter-injection is performed when the temperature of the cylinder has reduced.

That is, it can be found that in order to perform an effective follow-up injection, firstly, the timing when the heat release rate becomes about zero after the completion of the main-combustion is determined, and then the timing to begin the follow-up injection should be set at the timing which is advanced with the ignition-delay time: $\tau f$ from that timing. For example, at the middle engine speed and middle engine load, shown in the figure, when the follow-up injection timing was set at ATDC35° CA, the follow-up injection fuel began to ignite and burn at the timing of the completion of the main-combustion, and at this time, the ignition-delay time of the follow-up injection fuel: $\tau f$ was about 0.5 ms.

Accordingly, the timing of the completion of the main-combustion for respective engine operating condition is determined in advance from an experiment or the like. Then, considering the above-described ignition delay and a driving delay of the injector 5, the timing that is advanced with such delay times should be set as the follow-up injection timing: ITfu. The timing is stored electrically at the memory of the ECU 40 in the form of a map for each engine operating condition (follow-up ignition timing map, described below). And, during the operation of the engine 1, a target injection timing of the follow-up injection is read out from this map in response to the engine operating condition. Specifically, the above-described follow-up injection timing: ITfu, for example, is ATDC35° CA at low engine load and engine speed of 1500 rpm, and it is about ATDC40 to 35° CA at middle engine load and engine speed of 2000 rpm.

Here, the completion timing of the main-combustion at each engine operating condition can be obtained by calculating the heat release rate under the thermal dynamics and making a graph for those, based on a data of cylinder pressure at each engine operating condition which has been obtained from an experiment for each rank angle of the engine. Or, it may be obtained through an experiment by using a sensing signal from a temperature sensor for sensing the temperature of the combustion chamber 4, a combustion light sensor, a sensor for sensing the amount of hydrogen or hydrocarbon, which are gas with a biased electric charge and a high reactivity and exist in the combustion chamber 4, or the like.

Further, EGR3 and EGR4 of the EGR ratio shown in FIG. 7B constitute respective borders of forming a certain scope for the follow-up injection when the operation of the engine 1 transfers between the operating areas (H) and (D). Hereinafter, these are referred to as the border EGR ratio: EGRf1, EGRf2. Likewise, EGR5 and EGR6 of the EGR ratio shown in FIG. 8B are the border EGR ratio: EGRf1 and EGRf2 respectively when the operation of the engine 1 transfers from the diffusion combustion area (D) to the pre-mixed combustion area (H). Here, the border EGR ratio for respectively limiting the upper or the lower certain scopes described above (EGR3 and EGR5, EGR4 and EGR6) are slightly different to one another. This is to provide a stable control, but it is not limited to this, and it may be set, for example, EGR3=EGR5, and EGR4=EGR6.

Fuel Injection Control

Hereinafter, control steps of the injector 5 by the ECU 40 will be described based on flowcharts of FIGS. 10 and 11. Firstly, in step SA0 after the start of flowchart of FIG. 10, at least signals from the fuel pressure sensor 7, the crank angle sensor 11, the intake air pressure sensor 18, the air flow sensor 19, the linear O2 sensor 29, the accelerator opening sensor 39 and the like are inputted, and also respective flags stored at the memory of the ECU 40 are read in.

Subsequently, in step SA1, actual EGR ratio of the engine 1 (actual EGR ratio: EGR) is estimated. This estimation, for example, is achieved by a certain calculation on the basis of an intake air amount obtained based on the signal from the air flow sensor 19, an oxygen concentration obtained based on the signal from the linear O2 sensor 29, and a target fuel injection amount which will be described below. Next, in step SA2, a target engine torque: Trq of the engine 1 is read out from the target engine torque map and set accordingly, based on the engine speed: ne obtained from the crank angle signal and the accelerator opening: Acc. This target engine torque map includes the most proper values of target engine torque which are set responding to the engine speed: ne and the accelerator opening: Acc, and which has been obtained through an experiment, and it is stored electrically at the memory of the ECU 40. As shown in an exemplified map of FIG. 12, it is constituted such that the greater the accelerator opening: Acc or the engine speed: ne is, the greater the target engine torque is.

Subsequently, in step SA3, the combustion mode of the engine 1 is determined referring to the combustion mode map (FIG. 2). Namely, a determination is made based on the target engine torque: Trq and engine speed: ne as to whether the operation of the engine 1 is at the pre-mixed combustion area (H). If the answer is NO, that is, its operation is at the diffusion combustion area (D), it proceeds to step SA11. If the answer is YES, it proceeds to step SA4 and a determination is made as to whether the operation of the engine 1 in the previous control cycle was at the diffusion combustion area (D). This determination, for example, can be made based on flags representing the engine operating area that has been updated based on the determination result of step SA3 at the previous control cycle and then stored at the memory of the ECU 40. Then, if the answer is NO, it proceeds to step SA7, described below. If YES, that is, it was a transition from the diffusion combustion area (D) to pre-mixed combustion area (H), it proceeds to step SA5 and a transition flag: FH is set ON (FH←1) therein. Then, it proceeds to step SA6.

Figure 13:
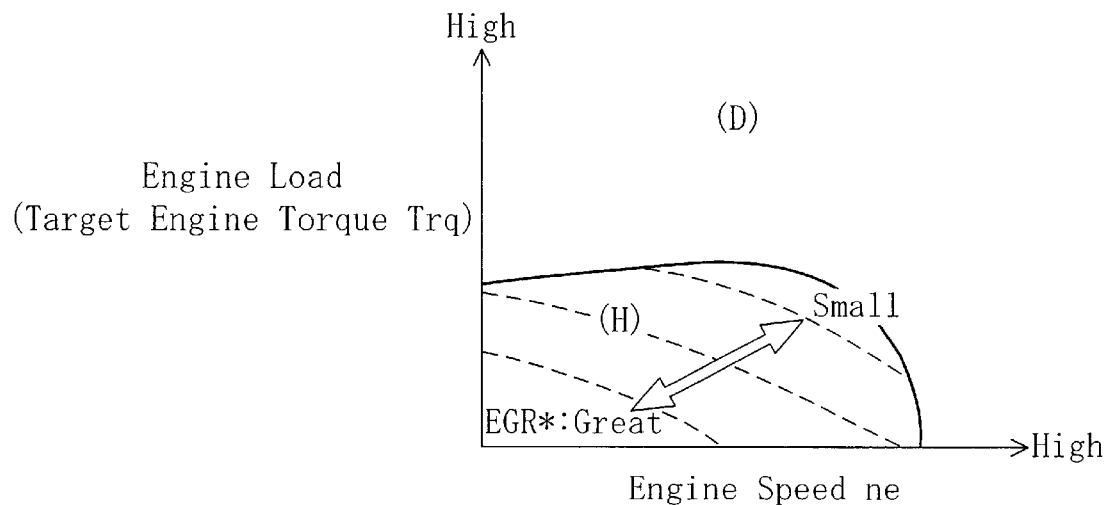
FIG. 13 is an explanatory diagram for showing an exemplified map of changing EGR ratio.

In this step SA6, EGR2 of the changing EGR ratio: EGR* is read out from the map and set accordingly, and EGRf1 and EGRf2 of the border EGR ratio: EGRf1 are set to predetermined values: EGR5 and EGR6 respectively (stored at the memory of the ECU 40). Then, it proceeds to step SB8 of FIG. 11 described below. Namely, the above-described changing EGR ratio map that includes EGRf1 and EGRf2 of the changing EGR ratio: EGR* corresponding to the operating condition of the engine 1 is set in advance based on an experiment. And, in an exemplified map of FIG. 13, it is set such that at the pre-mixed combustion area (H) after the transition, the greater the engine load of the engine 1 (target engine torque: Trq in the drawing) or the engine speed: ne is, the smaller the value of the changing EGR ratio: EGR* (EGR2 in the drawing) is.

Figure 14:
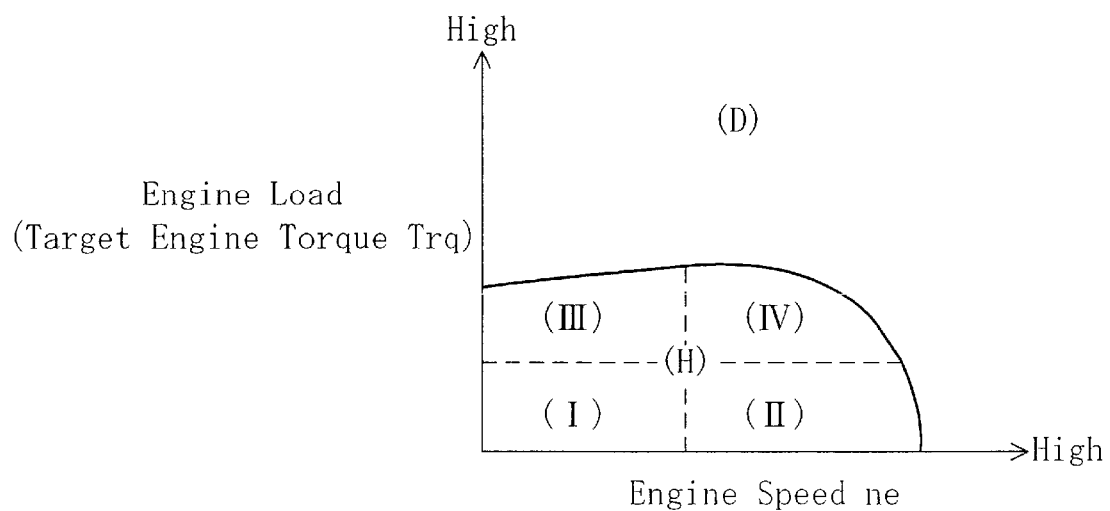
FIG. 14 is an explanatory diagram of a pre-mixed combustion area divided into four areas (I) to (IV) according to a magnitude of engine load and engine speed.

The reason the value of the changing EGR ratio: EGR* is independent upon the operating condition of the engine 1 like this is the following. Referring to FIG. 14 which shows schematically the pre-mixed combustion area (H) by four split areas according to the engine load and engine speed for an easy explanation, at the area (I) where the engine speed and engine load are relatively low, a good combustion where the amount of smoke produced is small until the EGR ratio become relatively high is maintained because an injection fuel amount is relatively small and a time to mix fuel with air becomes long enough, regardless of its conventional diesel combustion. Accordingly, the EGR ratio (changing EGR ratio: EGR*) at which the respective amounts of smoke production at the pre-mixed combustion (shown by solid lines) and at the diesel combustion (shown by broken lines) are almost the same becomes relatively high at the area (I) as shown schematically in FIG. 15 (I).

Figure 15:
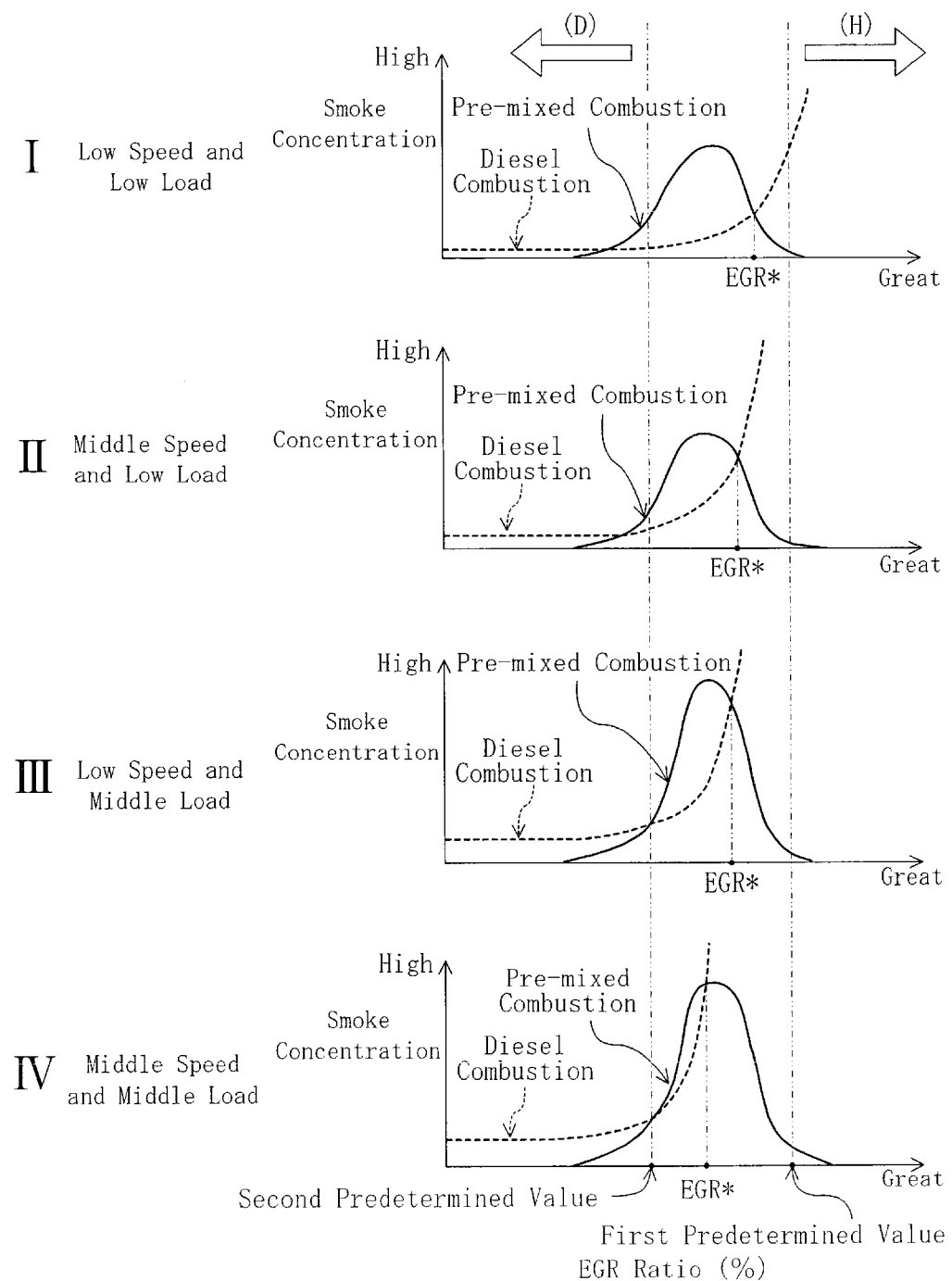
FIG. 15 is a graph for showing respective relationships between a change of actual EGR ratio and a change of smoke concentration at the areas (I) to (IV) at a combustion mode transition period.

Further, at the area (II) where the engine speed is middle and the engine load is low, the engine speed becomes high compared to the area (I) and thereby the time to mix fuel and air becomes short to provide easy production of smoke, so that the value of the changing EGR ratio: EGR* becomes slightly low, as shown in FIG. 15 (II). Likewise, in the area (III) where the engine speed is low and the engine load is middle, compared to the area (I) smoke is easy to be produced due to an increase of fuel injection amount, so that the value of the changing EGR ratio: EGR* becomes low compared to the area (I) and about the same as that at the area (II), as shown in FIG. 15 (I). Further, at area (IV) where the engine speed and engine load are middle, smoke comes to be produced the most easily among the four areas, so that the value of the changing EGR ratio: EGR* becomes the lowest, as shown in FIG. 15 (IV).

Meanwhile, in step SA7 following the previous step SA4 with the determination NO, a determination is made as to whether the transition flag: FH is ON (FH=1?). If the answer is YES, it proceeds to step SA6, while if it is NO, it proceeds to step SA8 to determine whether the operating condition of the engine 1 is at a rapid acceleration state. In this determination, for example, the accelerator opening: Acc increases and when the rate of the opening increase is larger than a predetermined standard value, it is considered as a rapid acceleration sate. And, if the answer is YES, it proceeds to step SA9 to make the transition flag ON (FH←1) and then proceeds to step SA10. Here, in the same way as the step SA6, respective values of the changing EGR ratio: EGR* and the border EGR ratio: EGRf1, EGRf2 are set (EGR*←EGRac0, EGRf1←EGRac1, EGRf2←EGRac2), and then it proceeds to step SB8 of FIG. 11, described below.

These EGRac0, EGRac1 and EGRac2 are stored at the memory of the ECU 40 respectively.

Figure 11:
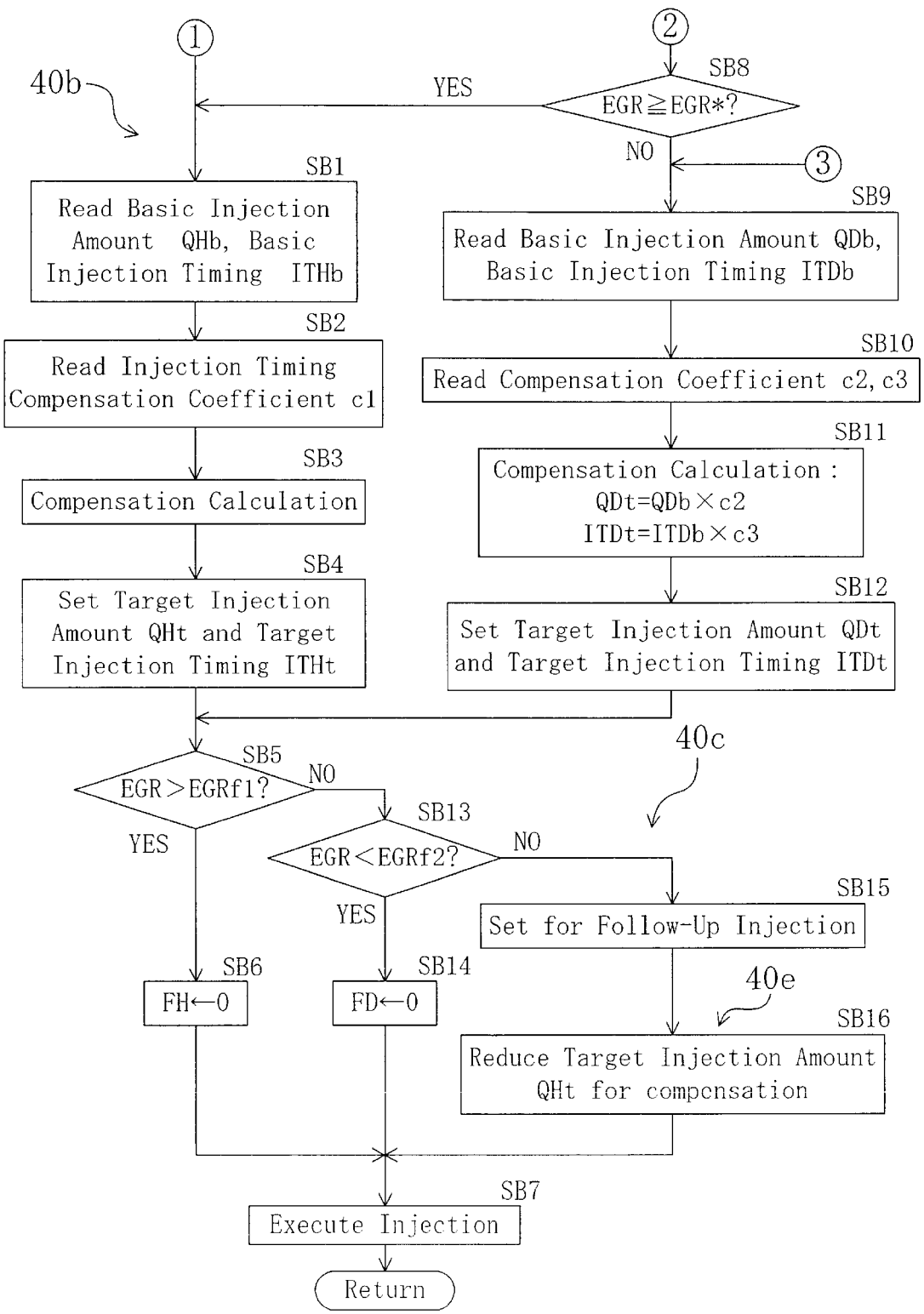
FIG. 11 is a flowchart for showing steps in the second half of fuel injection control.

On the other hand, if the answer is NO, not a rapid acceleration state, in step SA8, proceeding to steps SB1 to SB7 of a flowchart shown in FIG. 11, fuel is provided by the early injection through the injector 5 to form the pre-mixed combustion state. Namely, firstly in step SB1, a basic injection amount: QHb is read from the pre-mixed combustion area (H) of an injection amount map shown in FIG. 12B, based on the target engine torque: Trq and the engine speed: ne, and likewise, a basic injection timing: ITHb (crank angle position at which a needle of the injector 5 opens) is also read from an injection timing map shown in FIG. 12C. These injection amount map and injection timing map include respectively the most proper values thereof which are set responding to the target engine torque: Trq and the engine speed: ne, and which has been obtained through an experiment, and these are stored electrically at the memory of the ECU 40. It is constituted such that at the pre-mixed combustion area (H), the greater the target engine torque: Trq or the engine speed: ne is, the greater the basic injection amount: QHb of the injection amount map is.

Further, it is constituted such that at the pre-mixed combustion area (H), the greater the target engine torque: Trq or the engine speed: ne is, the more advanced the basic injection timing: ITHb of the injection timing map is, and the timing is set within a predetermined crank angle range of compression stroke of the cylinder 2 (for example, BTDC90° to 30° CA) correlating with the fuel injection amount and the fuel pressure so that fuel spray may be burned after most of that mixes sufficiently with air.

Subsequently, a compensation coefficient: c1 for the injection timing is read from a compensation table in step SB2. This compensation table includes the most proper values of compensation coefficient: c1 which are set corresponding to the EGR ratio to compensate the fuel injection timing by the injector 5 based on a state of the exhaust gas recirculation to the combustion chamber 4, and which has been obtained through an experiment, and this table is stored electrically at the memory of the ECU 40. The compensation table, for example, is set such that the larger the EGR ratio is, the more delayed the injection timing is. Then, a compensation calculation of the fuel injection amount and the fuel injection timing is made in step SB3. For example, this is done in such a manner that the target injection amount: QHt is obtained by compensating the basic injection timing: QHb based on the engine coolant temperature, the intake air pressure and the like, and the target injection timing: ITHt is obtained by multiplying the basic injection timing: ITHb by the compensation coefficient: c1.

Next, in step SB4, the target injection amount: QHt and the target injection timing: ITHt are set respectively, and in subsequent step SB5, a determination is made as to whether the estimated value of the actual EGR ratio of the engine 1 (actual EGR ratio: EGR) is larger than the border EGR ratio: EGRf1. If EGR>EGRf1 and the answer is YES, in subsequent step SB6, the transition flag: FH is cleared (FH←0). In subsequent step SB7, fuel injection by the injector 5 is performed when each cylinder 2 of the engine 1 comes to the fuel injection timing: ITHt of the compression stroke, and it returns after this.

That is, when it is determined based on the target engine torque: Trq and the engine speed: ne that the operating condition of the engine 1 is at the pre-mixed combustion area (H) and is not at a transition from the diffusion combustion area (D) and a rapid acceleration state either, the fuel is injected at the early timing within the certain crank angle range of the compression stroke through the injector 5 of each cylinder 2 as the pre-mixed combustion mode of the engine 1, so that it is ignited and burned with sufficient mixture of fuel and air (pre-mixed compression ignition combustion).

Figure 10:
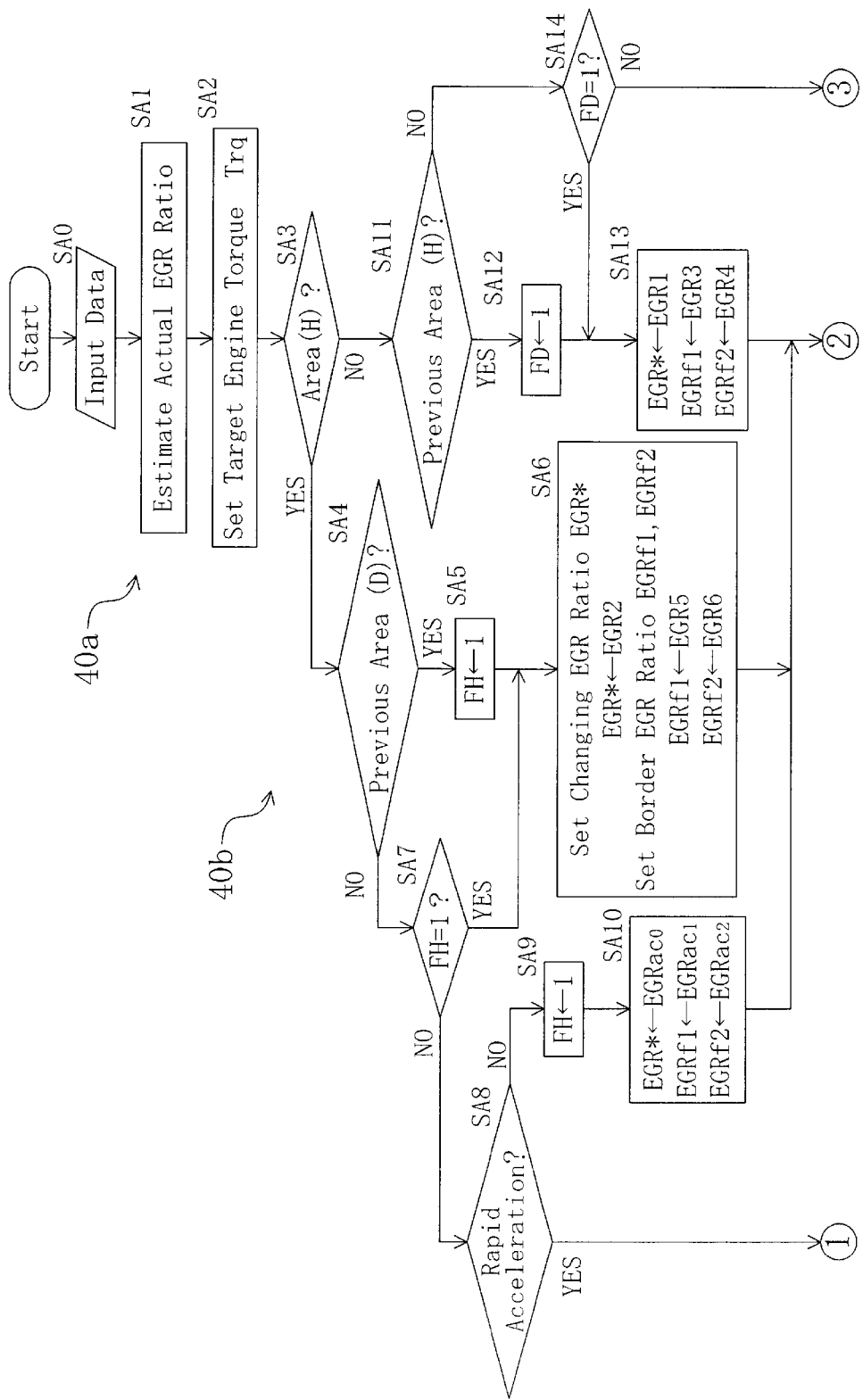
FIG. 10 is a flowchart for showing steps in the first half of fuel injection control.

Meanwhile, when the operating condition of the engine 1 is at the diffusion combustion area (D) and thus the answer of the determination in step SA3 in the flowchart of FIG. 10 is NO, it proceeds to step SA11. In step SA11, a determination is made as to whether the operating condition of the engine 1 in the previous control cycle was at the pre-mixed combustion area (H). If the answer is YES, it proceeds to step SA12 and the transition flag: FD is made ON (FD←1), and then it proceeds to step SA13. Herein, the changing EGR ratio: EGR* and the border EGR ratio: EGRf1, EGRf2 are set respectively in the same way as step SA6 (EGR*←EGR1, EGRf1←EGR3, EGRf2←EGR4), and it proceeds to step SB8 of FIG. 11 which will be described below. If the answer is NO in step SA11, it proceeds to step SA14 and whether the transition flag: FD is ON (FD=1?) is determined. If the answer is YES, it proceeds to step SA13, while if the answer is NO, it proceeds to steps SB9 to SB14 in the flowchart of FIG. 11. Then, the fuel is injected by the injector 5 at around TDC such that the diesel combustion state is made.

Figure 12A:
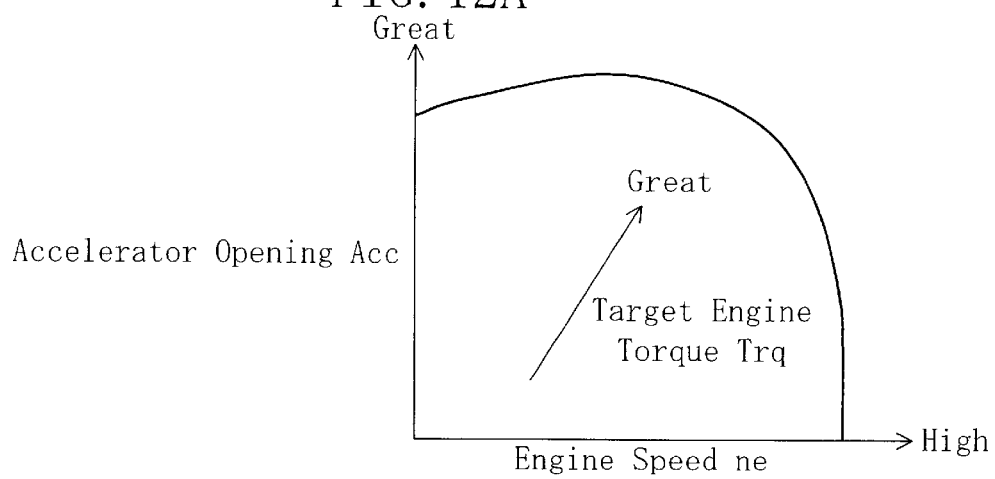
FIGS. 12A, 12B and 12C are explanatory diagrams for showing respectively a target engine torque map, an injection amount map and an injection timing map.
Figure 12B:
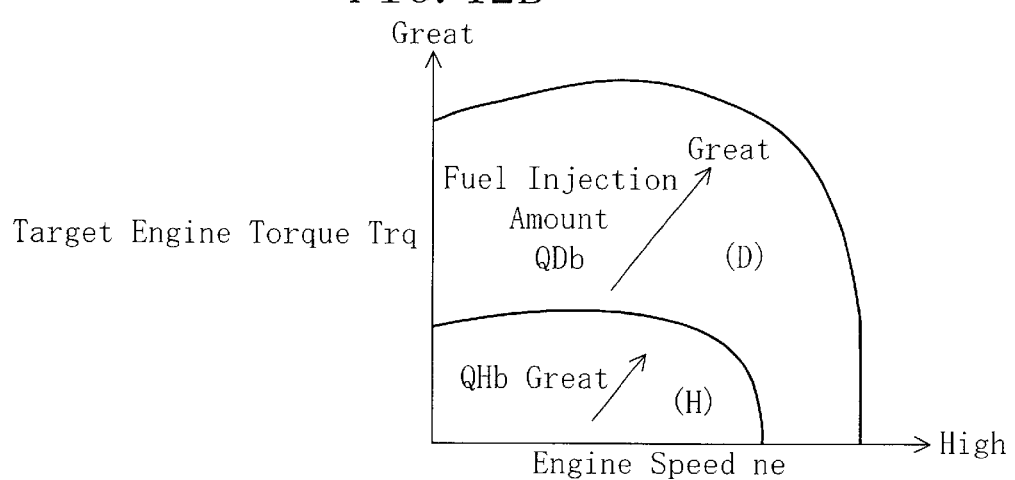
Figure 12C:
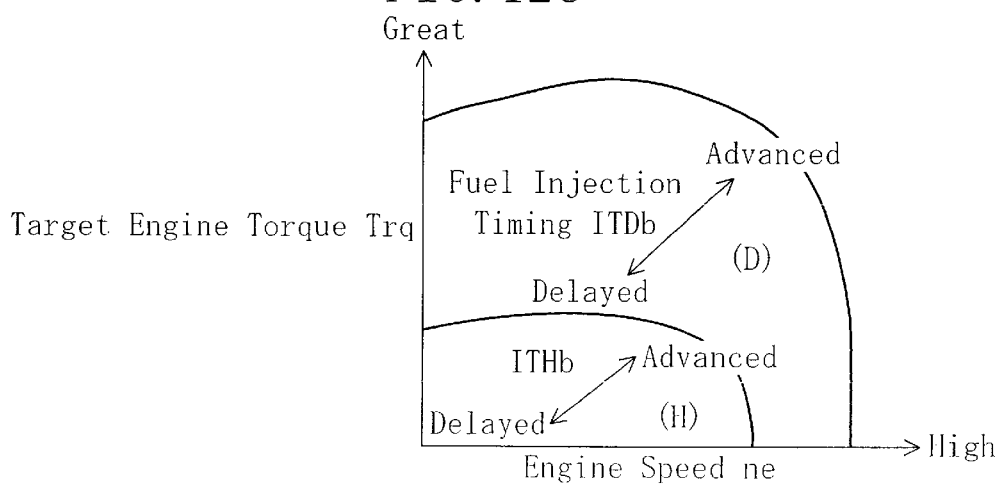

Namely, firstly, in step SB9, the basic injection amount: QDb is read from the diffusion combustion area (D) of the injection amount map (FIG. 12B) based on the target engine torque: Trq and the engine speed: ne. Likewise, the basic injection timing: ITDb is read from the diffusion combustion area (D) of the injection timing map (FIG. 12C). The injection amount map is set such that the greater the target engine torque: Trq or the engine speed: ne is, the larger the basic injection amount: QDb at the diffusion combustion area (D) is. The basic injection timing: ITDb at the diffusion combustion area (D) of the injection timing map is set correlating the fuel injection amount and the fuel pressure (common rail pressure) so that the completion timing of the fuel injection (crank angle position of a needle of the injector 5) can be a certain timing after the top dead center of compression and thereby the fuel spray can be burned properly with diffusion combustion.

Subsequently, in step SB10, respective compensation coefficients: c2 and c3 of injection amount and injection timing are read from the compensation table. This compensation table includes the most proper values of compensation coefficients: c2, c3 which are set corresponding to the EGR ratio to compensate the fuel injection amount and the fuel injection timing based on a state of the exhaust gas recirculation to the combustion chamber 4, and which has been obtained through an experiment, and this table is stored electrically at the memory of the ECU 40. The compensation table, for example, is set such that the injection amount decreases with the higher EGR ratio relatively, and the larger the EGR ratio is, the more delayed the injection timing is. In subsequent step SB11, a compensation calculation of the fuel injection amount and the injection timing is performed. This is done in such a manner that the target injection amount: QDt is obtained by multiplying the basic injection amount: QDb by compensation coefficient: c2, and the target injection timing: ITDt is obtained by multiplying the basic injection timing: ITDb by the compensation coefficient: c3.

Then, in step SB12, the target injection amount: QDt and the target injection timing: ITDt are set respectively. In subsequent step SB5, it is determined that the actual EGR ratio: EGR is EGRf1 or less and thereby the answer is NO. Then, in step SB13 it is determined that the actual EGR ratio: EGR is less than EGRf2 and thereby the answer is YES, and it proceeds to step SB14. In this step SB14, the transition flag: FD is cleared (FD←0), and it proceeds to step SB7, and herein, when each cylinder 2 of the engine 1 comes to the fuel injection timing: ITDt at around TDC of the cylinder, fuel injection by the injector 5 is executed and then it returns.

That is, when it is determined based on the target engine torque: Trq and the engine speed: ne that the operating condition of the engine 1 is at the diffusion combustion area (D) and is not at a transition from the pre-mixed combustion area (H), the fuel is injected at around TDC through the injector 5 of each cylinder 2 as the diesel combustion mode of the engine 1, so that it provides a conventional diesel combustion state. Here, the amount of fuel corresponding to the fuel injection amount: QDt may be injected at one time as a collective injection by opening the injector 5 at the injection timing: ITDt. Or, it may be injected at a plurality of times as a split injection from a certain timing which is advanced from the fuel injection timing: ITDt. Alternatively, in addition to these, small amount of additional fuel may be injected during the expansion stroke of the cylinder 2.

Meanwhile, when the operating condition of the engine 1 transfers between the pre-mixed combustion area (H) to the diffusion combustion area (D), firstly, the injection mode is changed based on the exhaust gas recirculation state to the combustion chamber 4. Namely, in step SB8 in the flowchart of FIG. 11, which is subsequent to steps SA6 or SA13 of FIG. 10, a determination is made as to whether the estimated value of the actual EGR ratio of the engine 1 (actual EGR ratio: EGR) is more than the changing EGR ratio: EGR*. If the answer is YES (EGR≧EGR*), it proceeds to steps SB1 to SB6 and the premixed combustion is performed. Conversely, if it is NO (EGR<EGR*), it proceeds to steps SB9 to SB14 and the diesel combustion is performed.

That is, when the operating condition of the engine 1 transfers from the pre-mixed combustion area (H) to the diffusion combustion area (D), the fuel injection mode is changed to the injection at around TDC after the actual EGR ratio: EGR becomes less than the changing EGR ratio: EGR* (the predetermined EGR1) (see FIG. 7B). Meanwhile, when the operating condition of the engine 1 transfers from the diffusion combustion area (D) to the pre-mixed combustion area (H), the fuel injection mode is changed to the early injection after the actual EGR ratio: EGR becomes more than the changing EGR ratio: EGR* (the predetermined EGR2) (see FIG. 8B).

At a transition between such operating areas (H), (D), the flow-up injection is executed during the actual EGR ratio: EGR is within a predetermined range. Namely, when it is determined that in step SB5, which is subsequent to steps SB4 or SB12, EGR≦EGRf1 and thereby the answer is No, and furthermore, in step SB13, the answer is NO (EGR≧EGRf2), (that is, EGRf2≦EGR≦EGRf1), it proceeds to step SB15. Then, the target injection amount: Qfu and the target injection timing: ITfu for the follow-up injection are set respectively. Specifically, values corresponding to the operating condition of the engine 1 are read form respective follow-up injection amount map and follow-up injection timing map that are stored electrically at the memory of the ECU 40, and these are set as the target injection amount: Qfu and the target injection timing: ITfu.

Figure 16A:
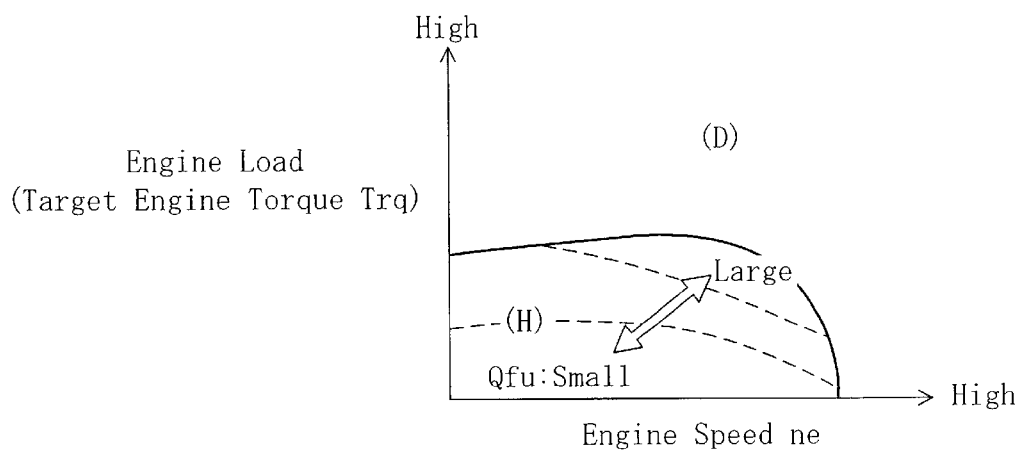
FIG. 16A is an explanatory diagram for showing a map of follow-up injection amount.
Figure 16B:
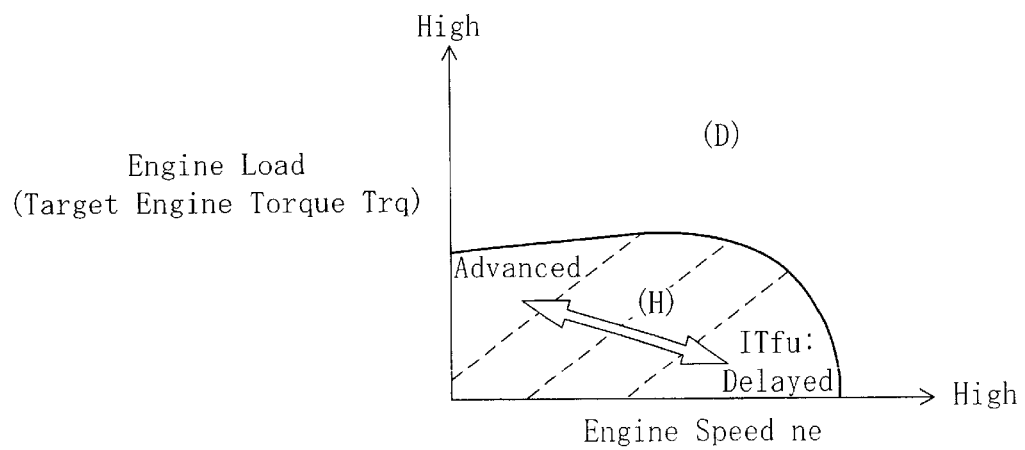
FIG. 16B is an explanatory diagram for showing a map of follow-up injection timing.

The above-described injection amount map and the injection timing map of the follow-up injection, as shown respectively in FIGS. 16A and 16B, include respectively the most proper values of the target injection amount: Qfu and the target injection timing: ITfu, corresponding to the operating condition of the engine 1 (the target engine torque: Trq and the engine speed: ne, shown in drawings), which has been obtained through experiments. The follow-up injection amount map exemplified in FIG. 16A is set in such a manner that the greater the target engine torque: Trq or the engine speed: ne is, the more the injection amount: Gfu at the pre-mixed combustion area (H) is. Namely, there is a tendency that the greater the target engine torque: Trq is, the more the fuel injection amount: QHt, QDt of the main-injection is, and that the higher the engine speed: ne is, the shorter the mixture time of fuel and air is. Both of these may cause an increase of smoke production. Thus, in order to burn the smoke produced again sufficiently, it is set such that the follow-up injection amount: Qfu increases accordingly.

The follow-up injection timing map exemplified in FIG. 16B is set in such a manner that the greater the target engine torque: Trq is or the lower the engine speed: ne is, the more advanced the injection timing: ITfu at the pre-mixed combustion area (H) is. Namely, when the main-injection amount: QHt, QDt is much with a large target engine torque: Trq, the main-injection timing is advanced relatively, thereby advancing the completion timing of the main-combustion. When the engine speed: ne is low, the completion timing of the main-combustion is advanced automatically. Accordingly, the injection timing: ITfu is set described above, so that the combustion by the follow-up injection begins when the combustion by the main-injection is almost completed.

Figure 17:
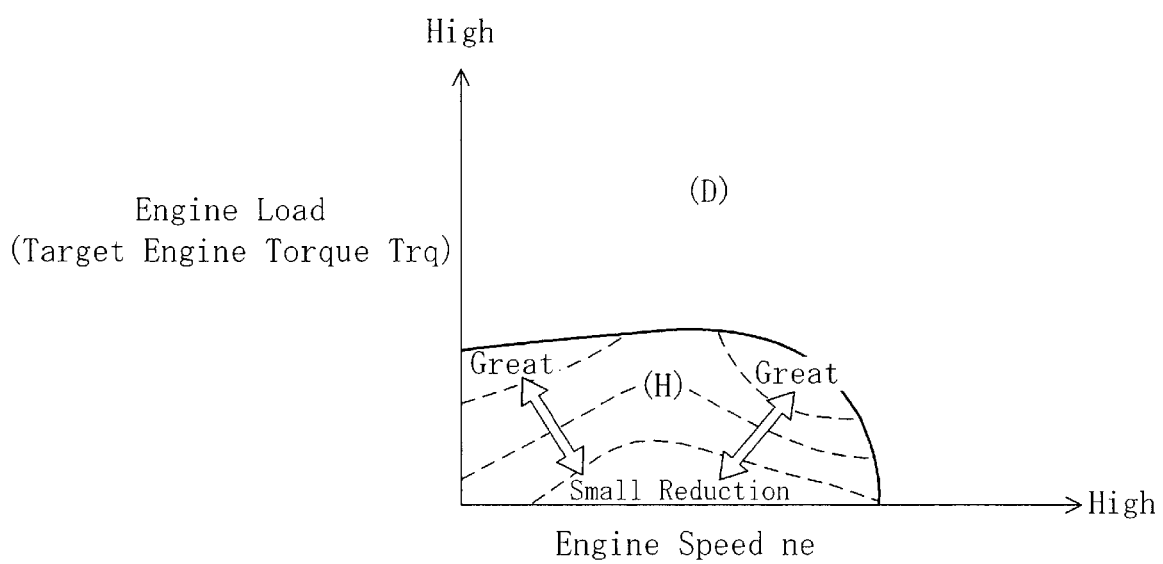
FIG. 17 is an explanatory diagram for showing an exemplified map of reduction compensation.

In step SB15 subsequent to the above step SB15, the target injection amount: QHt, QDt of the main-injection that are set in the above steps SB4 or SB12 is reduced for its compensation so as to offset an increase of the engine torque by the follow-up injection. That is, a reduction compensation map exemplified in FIG. 17 is stored electrically at the memory of the ECU 40. A compensation value corresponding to the operating condition of the engine 1 is read out from the map, and this compensation value is reduced from the target injection amount: QHt, QDt of the main-injection. The map of the drawing is set in such a manner that when the follow-up injection amount: Qfu is much or when the follow-up injection timing: ITfu is advanced so as to influence the engine torque greatly, the min-injection amount: QHt, QDt decreases by its compensation. And, it is set in such a manner that its compensation amount to reduce is large at the operating condition of middle-engine speed and middle-engine load where the follow-up injection amount: Qfu is relatively much, and at the operating condition of low-engine speed and middle-engine load where the follow-up injection timing: ITfu is advanced. A torque change of the engine 1 caused by the follow-up injection can be suppressed by this reduction compensation, so that good driving feelings are obtained.

In step SB7 subsequent to the above step SB16, when each cylinder 2 arrives at the main-injection timing, namely, the fuel injection timing: ITHt that is set during the compression stroke, or the fuel injection timing: ITDt that is set at around TDC, the fuel injection is executed by the injector 5. Subsequently, when it arrives at the follow-up injection timing: ITfu that is set during the expansion stroke of cylinder 2, fuel injection is executed again by the injector 5, and then it returns.

When the operating condition of the engine 1 is at the pre-mixed combustion area (H) and a rapid acceleration state happens, it is changed to the diesel combustion in advance for a preparation of a transition to the diffusion combustion area (D) at the higher-engine load, while the intake air amount or the fuel injection amount is still small. Namely, after the changing EGR ratio: EGR*, the border EGR ratio: EGRf1, EGRf2 are set respectively (EGR*←EGRac0, EGRf1←EGRac1, EGRf2←EGRac2) in step SA10 in the flowchart of FIG. 10, in step SB8 of FIG. 11 a determination is made as to whether the actual EGR ratio: EGR is greater than the changing EGR ratio: EGR*. If the answer is YES with EGR≧EGR*, it proceeds to the above-described steps SB1 to SB5. Whereas, if it is NO with EGR<EGR*, it proceeds to the above-described steps SB9 to SB12.

Namely, in the same way as the transition of the operating condition of the engine 1 from the pre-mixed combustion area (H) to the diffusion combustion area (D), the fuel injection mode is changed after the actual EGR ratio: EGR becomes lower than the changing EGR ratio: EGR*.

Further, at this time, the follow-up injection is executed while the actual EGR ratio: EGR is within the certain range. Namely, in step SB5 subsequent to the above steps SB4 or SB12 a determination is made with the answer of NO (EGR≦EGRf1), in step SB13 a determination is made with the answer of NO (EGR≧EGRf2), (that is, EGRf2≦EGR≦EGRf1), in step SB15 the target injection amount: Qfu and the target injection timing: ITfu of the follow-up injection are set respectively, in step SB16 the target injection amount: QHt of the main-injection is compensated, in step SB17 the main-injection and the follow-up injection by the injector 5 are executed, and then it returns.

Here, in general, the value of the changing EGR ratio: EGR* (predetermined value: EGRac0) at the above-described rapid acceleration state is set to a higher value than the changing EGR ratio: EGR* (EGR1) at the transition from the pre-mixed combustion area (H) to the diffusion combustion area (D), (that is, EGR<EGRac0). Accordingly, when the operating condition of the engine 1 is changed to the rapid acceleration state, the fuel injection mode is changed at an earlier timing compared to the above transition, and the change is executed while the fuel injection amount or the intake air amount is still small. As a result, the amount of exhausted smoke does not increase so much even if smoke concentration increases. In addition, at this time, a transient increase of smoke concentration is suppressed to a certain extent, and the follow-up injection help smoke burn again. Thus, a deterioration of exhausted gas can be sufficiently suppressed. Here, it may be set such that EGRac0=EGR1.

Step SA1 in the control flowchart of FIG. 10 constitutes EGR estimation section 40*a* (EGR estimation means) for estimating the actual EGR ratio of the engine 1. Step SA3 constitutes operating area determination section for determining whether the operating condition of the engine 1 is at the pre-mixed combustion area (H) or at the diffusion combustion area (D) based on the target engine torque: Trq and the engine speed: ne of the engine 1.

Further, steps SA4 to SA14 in the above control flowchart and steps SB1 to SB14 in the control flowchart of FIG. 11 constitute main-injection control section (main-injection control means), in which the fuel is injected through the injector 5 at the early timing during the compression stroke of each cylinder 2 to provide the pre-mixed combustion when the operating condition of the engine 1 is at the pre-mixed combustion area (H), while the fuel is injected at least at around the TDC to provide the conventional diesel combustion when the operating condition at the diffusion combustion area (D).

Here, the above main-injection control section 40*b* is constituted so as to change the fuel injection mode after it is determined based on the estimated EGR value of the real EGR ratio by the above EGR estimation section 40*a* that a state of the actual exhaust gas recirculation to the combustion chamber 4 becomes an appropriate state (EGR=EGR1, EGR2) for changing the fuel injection mode, not by changing the fuel injection mode at once when the operating condition of the engine 1 transfers between the pre-mixed combustion area (H) and the diffusion combustion area (D).

The above main-injection control section 40*b* changes the fuel injection mode to the injection at around the TDC so as to provide the diesel combustion when the operating condition of the engine 1 is at the pre-mixed combustion area (H) and at a state of a certain rapid acceleration or more. In this case, it is also constituted so as to change the fuel injection mode after it is determined based on the estimated EGR value of the real EGR ratio that a state of the actual exhaust gas recirculation to the combustion chamber 4 becomes an appropriate state (EGR=EGRac) for changing the fuel injection mode, not by changing at once.

Further, step SB15 in the flowchart of FIG. 11 constitutes latter-injection control section 40*c* (latter-injection control means), in which the follow-up injection is executed through the injector 5 during the predetermined range of the expansion stroke of each cylinder 2 so that the combustion may begin at around the timing: t1 (when the heat release rate becomes about zero) of completion of the main-combustion when the operating condition of the engine 1 transfers between the pre-mixed combustion area (H) and the diffusion combustion area (D). Step SB16 constitutes main-injection amount compensation section 40*e* (main-injection amount compensation means), in which the main-injection amount of fuel is reduced for compensation so as to offset the increase of engine torque of the engine 1 by the follow-up injection when the follow-up injection is executed by the latter-injection control section 40*c*.

The above latter-injection control section 40*c* is constituted so as to execute the follow-up injection when it is determined that the actual EGR ratio: EGR is within the predetermined range based on the actual EGR ratio: EGR estimated by the EGR estimation section 40*a*. It may be constituted such that the follow-up injection begins slightly after the main-combustion completion timing: t1, and thereby, for example, within a rage of about ATDC about 10° to about 60° CA.

EGR Control

Next, specific steps of EGR control by the ECU 40 will be described based on a flowchart of FIG. 18. First, in step SC1 after a start, signals at least from the fuel pressure sensor 7, the crank angle sensor 11, the intake air pressure sensor 18, the air flow sensor 19, the linear O2 sensor 29, the accelerator opening sensor 39 and the like are inputted (data input), and values of various flags stored at the memory of the ECU 40 are read. Then, in step SC2, in the same way as step SA8 in the fuel injection timing flowchart of FIG. 9, a determination is made as to whether the operating condition of the engine 1 is at the rapid acceleration state. If the answer is YES, it proceeds to step SC7, which will be described below, while if it is YES, it proceeds to step SC3.

In step SC3, in the same way as step SA3 in the above fuel injection control flowchart, the combustion mode of the engine 1 is determined, and if it is at the diffusion combustion area (D) with the answer of NO, it proceeds to step SC6. On the other hand, if it is at the pre-mixed combustion area (H) and the answer is YES, it proceeds to step SC4, and a target value: EGRH of opening of the EGR valve 35, which corresponds to the operating condition of the engine 1, is read from a EGR map stored electrically at the memory of the ECU 40 and set accordingly. Subsequently, in step SC5, a control signal is outputted from the ECU 40 to the solenoid valve 37 for the diaphragm of the EGR valve 35 (EGR valve operation), and then it returns.

Meanwhile, in step SC6 after step SC3 where the determination was made that the operating area of the engine 1 was at the diffusion combustion area (D) with the answer of NO, the target value: EGRD of opening of the EGR valve 35, which corresponds to the diffusion combustion state of the engine 1, is read from the EGR map. Then, it proceeds to step SC5 and the EGR valve 35 is operated and it returns.

Figure 19:
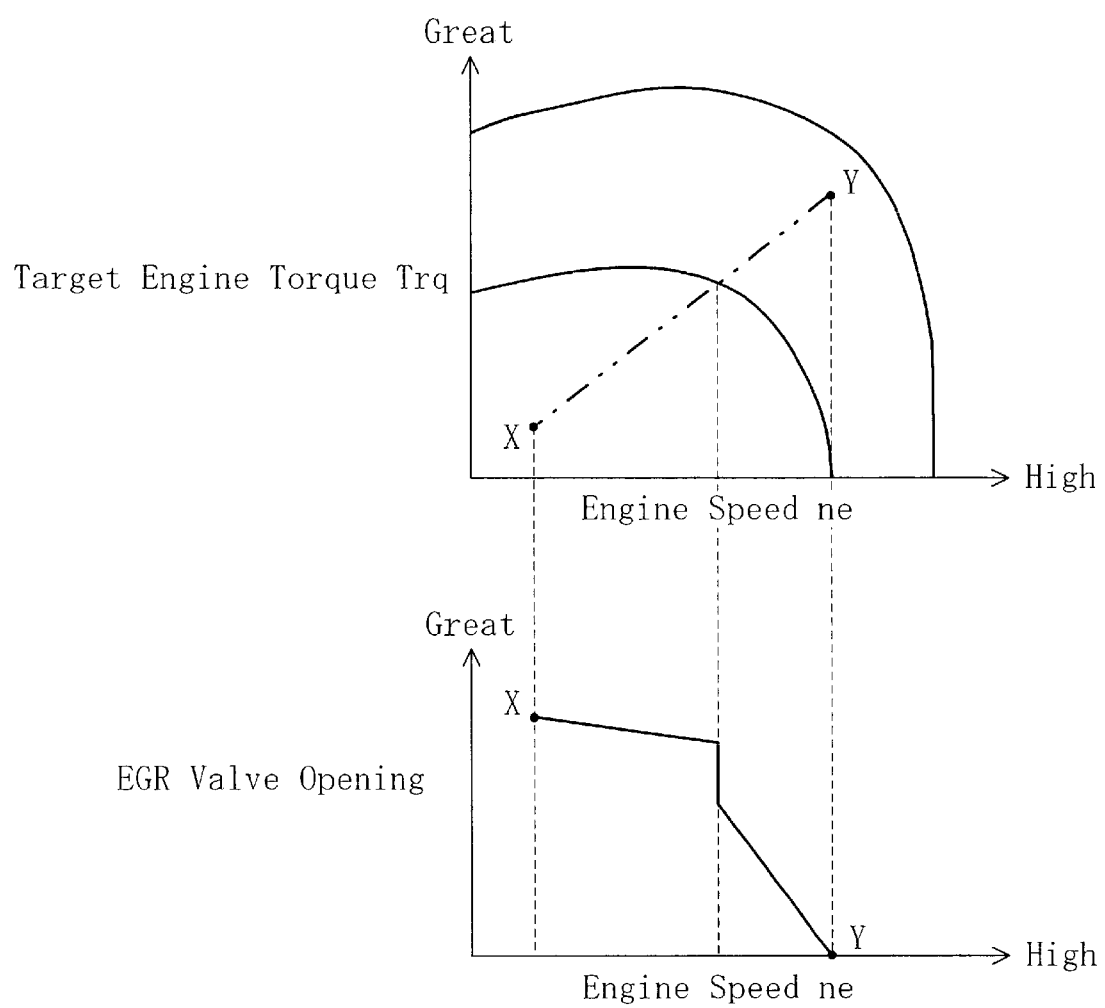
FIG. 19 is an explanatory diagram for showing an EGR map and changing characteristics of an EGR valve opening on the EGR map.

The above-described EGR map includes the most proper values that correspond to the target engine torque: Trq and the engine speed: ne, which have been obtained through a experiment. As shown in an exemplified map of FIG. 19, the EGR map is constituted such that the greater the target engine torque: Trq or the engine speed is, the smaller the target values: EGRH and EGRD at the pre-mixed combustion area (H) and the diffusion combustion area (D) respectively are. More specifically, the target values: EGRH, EGRD are set respectively so that the opening of the EGR valve 35 may change as shown in the drawing while the engine operating condition changes from a certain state (shown by a point X in the figure) at low engine speed and low engine torque to a certain state (shown by point Y in the figure) at high engine speed and high engine load. That is, when seen along line X-Y representing a locus of the operation change, the opening of the EGR valve 35 decreases gradually toward the high engine speed and high engine torque at the pre-mixed combustion area (H), decreases considerably at the border between the diffusion combustion area (D), and again decreases gradually toward the high engine speed and the high engine load. Here, the rate of change of the opening of the EGR valve 35 with respect to change of the operating condition of the engine 1 is set so that it can be extremely small at the mixture-combustion area (H), while it can be relatively large at the diffusion combustion area (D).

Namely, when the operating condition of the engine 1 is at the pre-mixed combustion area (H), the EGR valve 35 is opened widely and a lot of exhausted gas is recirculated into the intake air passage 16 through the EGR passage 34, so that the EGR ratio: EGR is controlled larger than the first predetermined value and thus proper pre-mixed compression ignition combustion is achieved. On the hand, when it is at the diffusion combustion area (D), the combustion state of the engine 1 is made the conventional diesel combustion state, and here the opening of the EGR valve 35 is controlled relatively small and the EGR ratio: EGR is controlled to a proper state smaller than the second predetermined value. Thus, NOx production can be suppressed without an increase of smoke.

In step SC7 after step SC2 where the determination was made that the operating condition of the engine 1 was at the rapid acceleration state with the answer of YES, even if it is at the pre-mixed combustion area (H), the target value of the opening of the EGR valve 35 is set to the predetermined value: EGRE so that the EGR ratio: EGR can be smaller than the second predetermined value. Then the EGR valve 35 is operated in the subsequent step SC5, and it returns. That is, even if the operating condition of the engine 1 is at the pre-mixed combustion area (H), the EGR valve 35 is closed at the rapid acceleration state, preparing for the transition to the coming diffusion combustion area (H).

Figure 18:
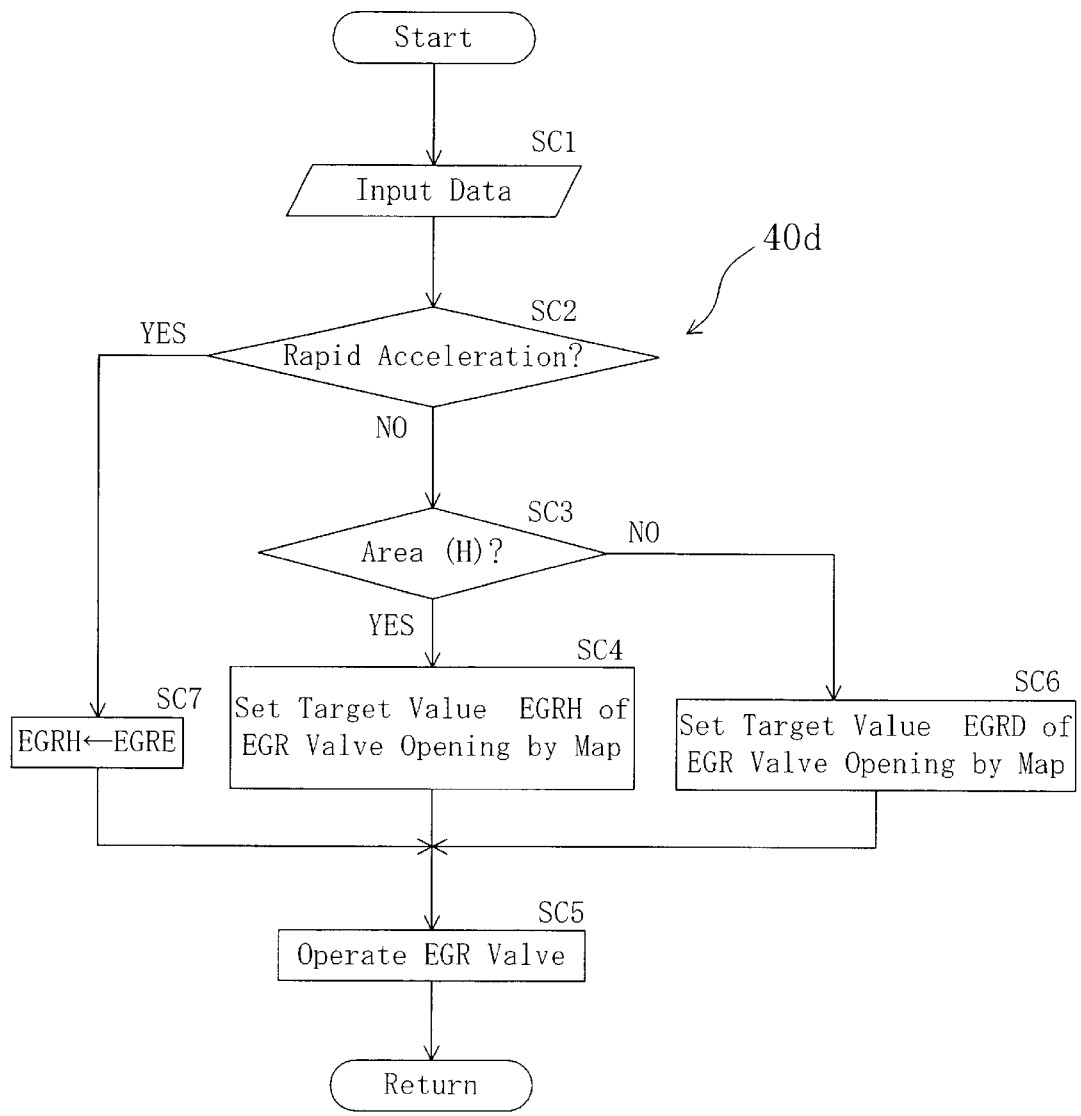
FIG. 18 is a flowchart for showing steps of EGR control.

The steps in the control flowchart of FIG. 18 constitutes EGR control section 40*d* (exhaust gas recirculation control means), in which when the operating condition of the engine 1 is at the pre-mixed combustion area (H) as a whole, the opening of the EGR valve 35 is controlled so that the EGR ratio can be larger than the first predetermined value, while when the operating condition of the engine 1 is at the diffusion combustion area (D), the opening of the EGR valve 35 is controlled so that the EGR ratio can be smaller than the second predetermined value which is smaller than the first predetermined value.

Further, the EGR control section 40d controls the EGR valve 35 so that the EGR ratio: EGR can be smaller than the above second predetermined value even if it is at the pre-mixed combustion area (H) when the operating condition of the engine 1 is at a certain rapid acceleration state or more.

Function and Effect of the Embodiment 1

Now the function and the effect of the combustion control apparatus A for the diesel engine 1 according to the present embodiment will be described. Firstly, when the operating condition of the engine 1 is at the pre-mixed combustion area (H) and not at the transition from the diffusion combustion area (D), the EGR valve 35 is relatively opened widely and the exhaust gas derived from the exhaust gas passage 26 upstream of the turbine 27 is recirculated into the intake air passage 16 through the EGR passage 34. A large amount of exhaust gas recirculated is supplied to the combustion chamber 4 of each cylinder 2 along with the fresh air from the outside, and thereby it becomes a state where the recirculation ratio of exhaust gas to the combustion chamber 4 is high (a state where the actual EGR ratio: EGR is greater than the first predetermined value).

It is considered that by a fuel injection through the injector 5 performed to the combustion chamber 4 with the above state that begins during a certain crank angle range (BTDC 90° to 30° CA) of the compression stroke of each cylinder 2, fuel mixture is formed and burns as described below. Namely, the fuel injected at early timing described above disperses widely into the combustion chamber 4 and mixes with the intake air (fresh air and recirculated exhausted gas) sufficiently, so that the mixture with high homogeneity is formed. In this mixture, particularly, at a portion having high density of fuel vapor and oxygen, an oxidation reaction with relatively low temperature (so called, cold flame) progresses. However, a large amount of the exhaust gas (carbon dioxide and the like) that has large thermal capacity compared to the air (nitrogen, oxygen and the like) is contained in the mixture, and thereby the density of fuel and oxygen becomes relatively low. And, a reaction heat is absorbed in the gas with large thermal capacity, such as carbon dioxide. As a result, it is suppressed to transfer to an oxidation reaction with high temperature, and the ignition-delay time is prolonged.

When the cylinder 2 arrives at around the top dead center of its compression, the gas temperature in the combustion chamber 4 increases more and the density of fuel and oxygen becomes high enough, the mixture ignites almost all at once and burns. In this situation, the fuel vapor, the air and the recirculated exhaust gas in the mixture have been mixed sufficiently and disperse evenly. Also, because the cold-flame reaction progresses at a portion having relatively high density of fuel, there exists little portion where fuel is too rich in the mixture. Accordingly, little smoke produced by the combustion is found.

Further, because the distribution of the fuel vapor is even in the mixture as described above, no rapid heat generation occurs partially even if the whole mixture burns all at once. In addition, because the heat generated by the reaction of fuel and oxygen (combustion heat) is absorbed by the exhausted gas (carbon dioxide and the like) dispersed around, an increase of the combustion temperature is suppressed as a whole. As a result, NOx can be reduced extremely.

Meanwhile, when the operating condition of the engine 1 is at the diffusion combustion area (D) and not at the transition from the pre-mixed combustion area (H), the fuel is injected by the injector 5 into the combustion chamber 4 at least at around the TDC, and thereby proper diffusion combustion (conventional diesel combustion) is achieved following the initial pre-mixed combustion. Here, the opening of the EGR valve 35 is controlled to a relatively small opening, and NOx and smoke are reduced by the appropriate amount of the exhaust gas recirculation. Further, because the recirculation ratio of exhaust gas becomes less than the predetermined value (actual EGR ratio≦the second predetermined value), a sufficient amount of air is maintained and thus high power of engine can be obtained.

Further, when the operating condition of the engine 1 transfers from either one of the pre-mixed combustion area (H) to the other one thereof, firstly, the recirculation amount of exhaust gas is changed by controlling the opening of the EGR valve 35. Then, after the actual EGR ratio: EGR becomes the changing EGR ratio: EGR* thereby, the fuel injection mode by the injector 5 is changed. Accordingly, for example, at the transition from the pre-mixed combustion area (H) to the diffusion combustion area (D), the diesel combustion is not performed while the recirculation ratio of exhaust gas to the intake air is too high. And conversely, at the transition from the diffusion combustion area (D) to the pre-mixed combustion area (H), the early injection is not performed while the recirculation ratio of exhaust gas to the intake air is too low. As a result, an increase of the combustion noise caused by the too early ignition and a transient deterioration of the exhaust gas condition can be suppressed.

Furthermore, the follow-up injection is performed following the main-injection of fuel when the actual EGR ratio: EGR is within the predetermined range (EGRf2≦EGR≦EGRf1). The combustion by this injected fuel makes the smoke that has been produced by the main-injection burn again, and thereby the smoke concentration in the exhausted gas reduces. Accordingly, the smoke concentration can be reduced greatly along with the suppression of the smoke production described above.

In addition, when the operating condition of the engine 1 is at the pre-mixed combustion area (H) and a rapid acceleration state happens, it is changed to the diesel combustion in advance for a preparation of a transition to the diffusion combustion area (D). Accordingly, because the intake air amount or the fuel injection amount is still small at this changing period, the amount of the exhausted smoke itself does not increase so much even if the smoke concentration increases. In this case, in the same way as the transition the pre-mixed combustion area (H) to the diffusion combustion area (D) which is described above, the fuel injection mode is changed after the actual EGR ratio: EGR becomes lower than the changing EGR ratio: EGR* (predetermined value: EGRac), and the follow-up injection is performed as well. Accordingly, a transient increase of smoke can be suppressed. The exhaust gas amount itself is small described above, and thus a deterioration of exhaust gas condition can be suppressed enough.

Further, in the present embodiment, the actual EGR ratio: EGR is estimated by output signals from the linear O2 sensors 29 provided at the exhaust gas passage 26 and the like. According to a result of this estimation, the above-described control is executed. Thus, changing the combustion mode of the engine 1 and executing the follow-up injection and the like can be achieved at appropriate timing, in accordance with an actual change of the recirculation exhaust gas ratio in the combustion chamber 4.

In addition, in the engine 1 of the present embodiment, the actual compression ratio of the cylinder 2 is set to a relatively small ratio, about 17 or less, and the recirculated exhaust gas through the EGR passage 34 is cooled by the EGR cooler 37. Thus, a temperature condition of the combustion chamber 4 at the latter half of the compression stroke of cylinder 2 can be made low relatively. Accordingly, when the operating condition of the engine 1 transfers between the pre-mixed combustion area (H) and the diffusion combustion area (D), an increase of combustion noise caused by the too early ignition of the pre-mixed mixture and a deterioration of the exhaust gas condition can be suppressed more and effectively.

Embodiment 2

Figure 20:
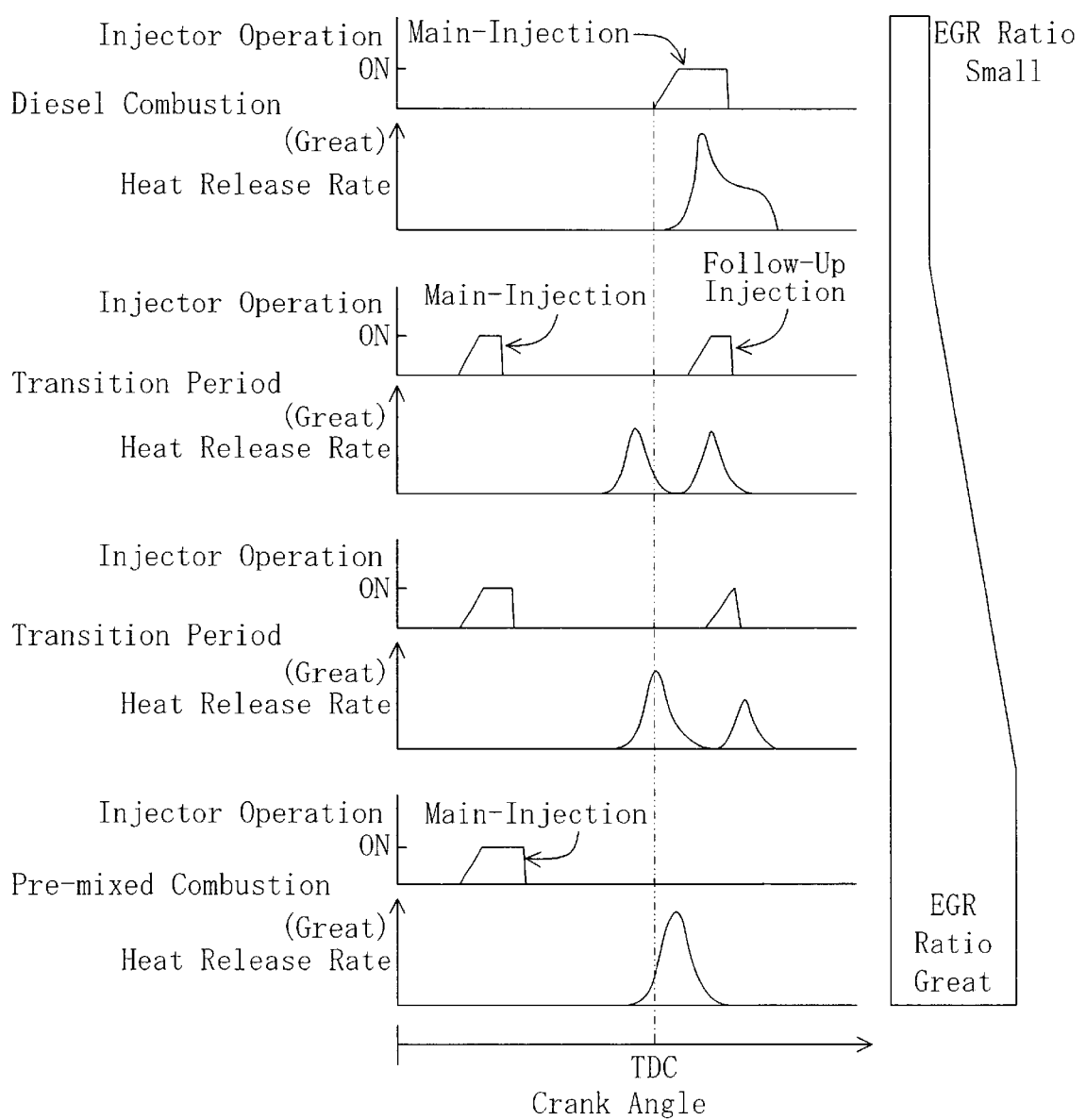
FIG. 20 is an explanatory diagram for showing a relationship between a change of actual EGR ratio and a change of fuel injection mode at a combustion mode transition period according to the second embodiment of the present invention.
Figure 21:
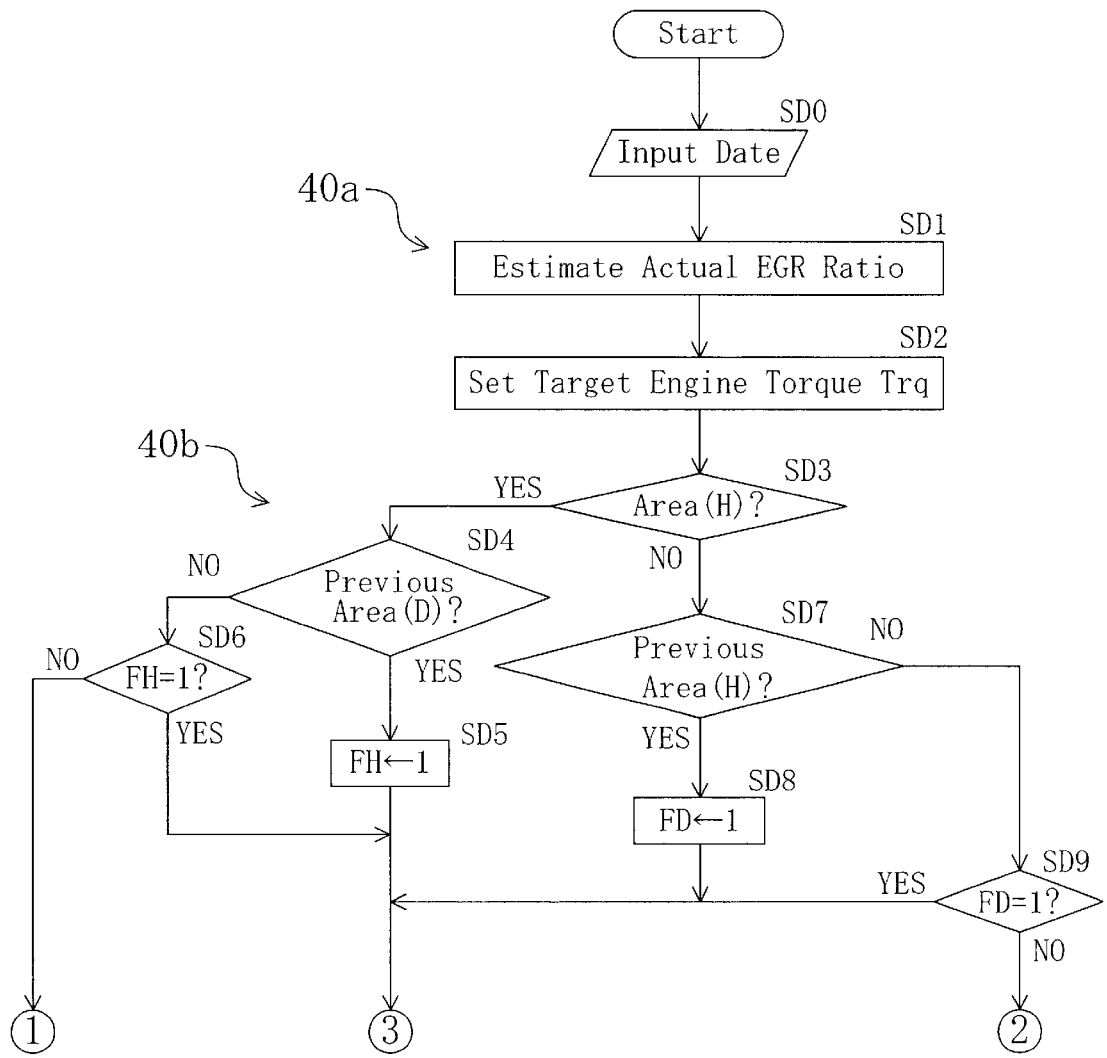
FIG. 21 is a flowchart equivalent to FIG. 10 in the second embodiment.
Figure 22:
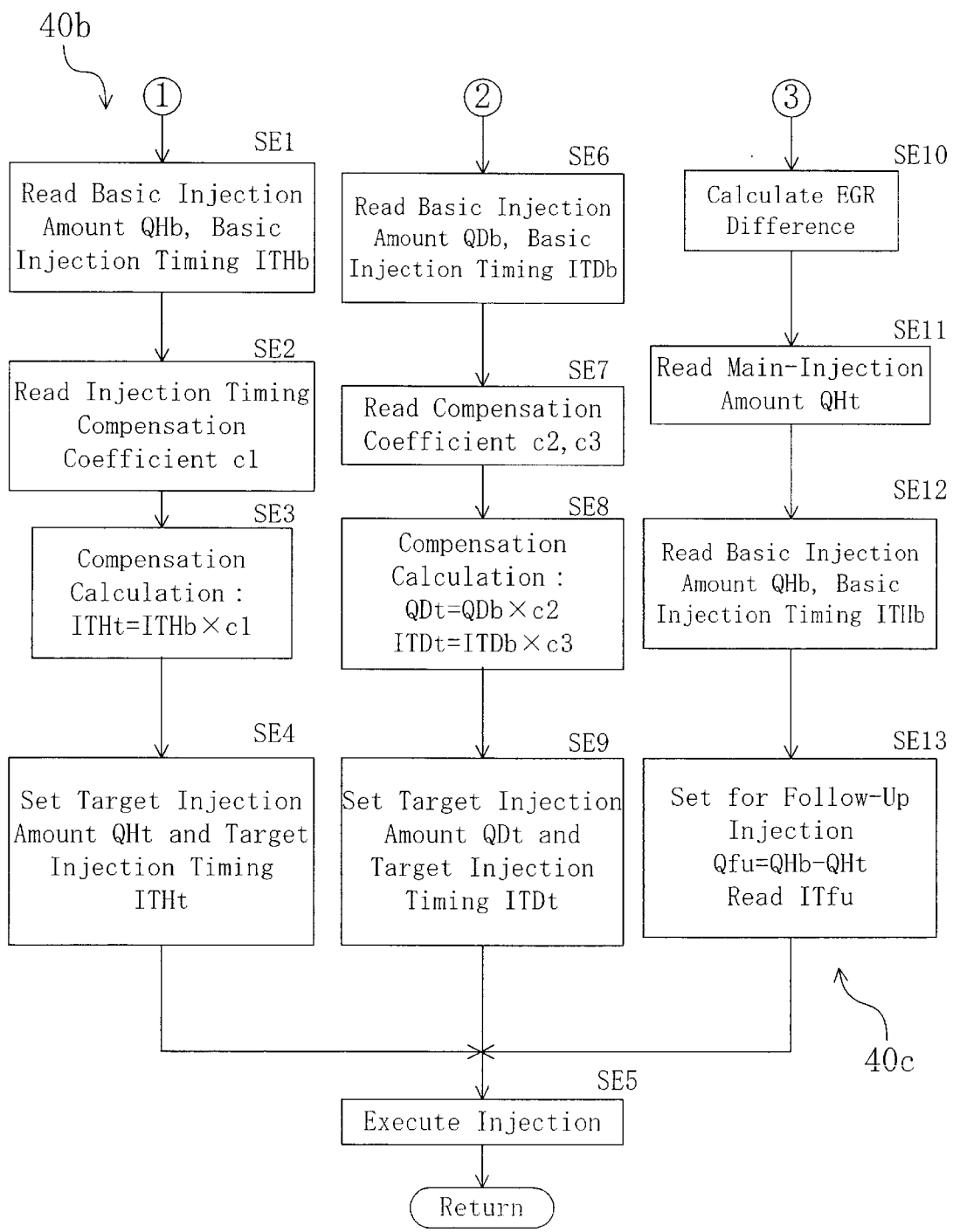
FIG. 22 is a flowchart equivalent to FIG. 11 in the second embodiment.

FIGS. 20 to 22 show a control at a transition of combustion mode of a combustion control apparatus A according to the second embodiment of the present invention. The present embodiment includes a feature thereof, in which the early injection is always executed to provide combustion by pre-mixed compression ignition at the transition of combustion mode and a follow-up injection is also executed, and the combustion by the follow-up injection is made contribute to the engine output actively. Here, the whole structure of the combustion control apparatus of the present embodiment is the same as that of the first embodiment (FIG. 1). Therefore, the same components as the first embodiment have the same reference numerals and explanation thereof will be omitted.

More specifically, for example, as shown in FIG. 20, at the transition from the diesel combustion to the pre-mixed combustion mode, the fuel injection mode is changed from the injection at around TDC to the early injection at the compression stroke, at the same time as the opening of the EGR valve 35, which is different to the first embodiment where it is waited until the actual EGR ratio: EGR becomes the changing EGR ratio: EGR*. In addition to this, the follow-up injection is executed. Here, the ratio of the follow-up injection fuel amount: Qfu with respect to the main-injection fuel amount: GHt is made considerably high compared to the first embodiment, and thereby the amount of fuel by the main-injection that is performed at the early timing of the compression stroke of cylinder 2 is made as small as possible. Thus, the too-early ignition of this fuel can be suppressed.

Further, as shown in the drawing, according to the increase of the actual EGR ratio, namely, the gradual decease of difference between the target EGR ratio (the first predetermined value or more) and the actual EGR ratio: EGR after the transition of the combustion mode, the main-injection fuel amount is increased gradually, while the follow-up injection fuel amount is decreased gradually. Then, when the difference of the EGR ratio becomes almost zero, the follow-up injection is completed, thereby a completion of the transition to the pre-mixed combustion mode with the early injection during the compression stroke (main-injection).

Conversely, at the transition from the pre-mixed combustion mode to the diesel combustion, according to the gradual decease of the actual EGR ratio by closing operation of the EGR valve 35, namely, the gradual increase of the difference of the EGR, the main-injection fuel amount is decreased gradually, while the follow-up injection fuel amount is increased gradually. Then, when the actual EGR ratio: EGR becomes the appropriate value (the second predetermined value or less), the follow-up injection is completed and the main-injection timing is changed to around the TDC, thereby a completion of the transition to the diesel combustion mode.

Next, control steps at the above-described transition of the combustion mode will be described referring flowcharts shown in FIGS. 21 and 22. In steps SD0 to SD6 of FIG. 21, the same control steps as steps SA1 to SA5, SA7 in the flowchart of the first embodiment shown in FIG. 10 are executed. That is, when it is the transition from the diffusion combustion area (D) to the pre-mixed combustion area (H), it proceeds to step SE10 of FIG. 22. When it is not, it proceeds to step SE1 of the drawing. In steps SD7 to SD9 subsequent to step SD3, a determination is made as to whether it is the transition from the pre-mixed combustion area (H) to the diffusion combustion area (D), in the same way as steps SA11, SA12, SA14 in the flowchart of the first embodiment (FIG. 10). If the answer is YES, it proceeds to step SE10. If it is NO, it proceeds to SE6.

Then, in steps SE1 to SE4 (FIG. 22) subsequent to the above step SD3, SD4, SD6 where it was determined that the operating condition of the engine 1 is the pre-mixed combustion area (H) and not at the transition thereof, the same control steps as steps SB1 to SB4 in the flowchart of the first embodiment shown in FIG. 11 are executed. Then, in step SE5, in the same way as step SB7 in the above flowchart, the fuel main-injection (early injection) by the injector 5 is executed so as to provide the pre-mixed combustion, and then it returns.

In steps SE6 to SE9 subsequent to the above steps SD3, SD7, SD9 where it was determined that the operating condition of the engine 1 is at the diffusion combustion area (D) and not at the transition, the same steps as the steps SB9 to SB 12 in the flowchart of the first embodiment are executed. In subsequent step SE5, the main-injection of fuel (injection at around TDC) by the injector 5 is executed so as to provide the diesel combustion, and then it returns.

Further, in step SE10 subsequent to the above steps SD5, SD6 or SD8, SD9 where it was determined that the operating condition is at the transition of the combustion mode, the difference (EGR difference) between the actual EGR ratio: EGR and the target EGR ratio at the pre-mixed combustion mode is calculated. The target EGR ratio is calculated based on the target value of the EGR valve (EGRH) which is stored at the EGR map (FIG. 19) and the operating condition of the engine 1 corresponding thereto. The EGR difference is obtained by deducting the actual EGR ratio: EGR from the target EGR ratio.

Figure 23:
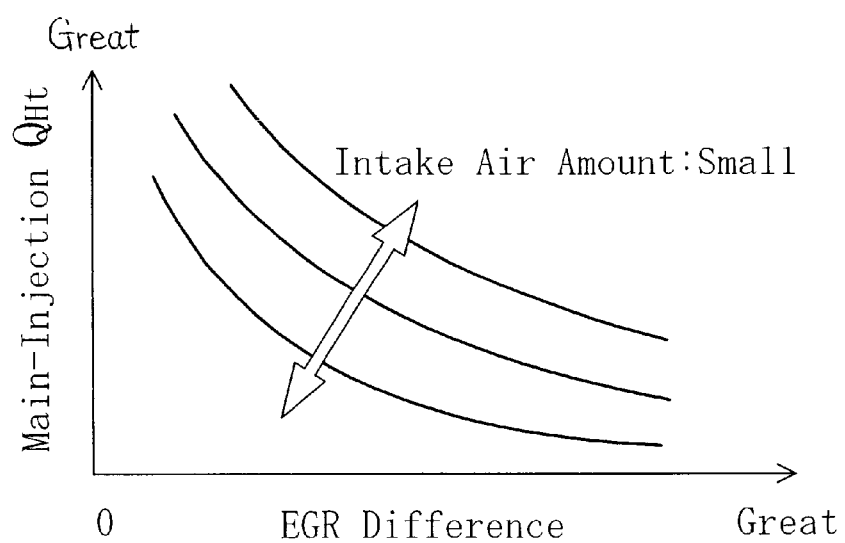
FIG. 23 is an explanatory diagram for showing an exemplified map of injection amount at a transition period.

Subsequently, in step SE11, the main-injection amount: QHt is read from an injection amount map for transition, which is previously set, based on the intake air amount of the engine 1 and the EGR difference. The injection amount map for transition includes the most proper values that correspond to the intake air amount and the EGR difference and that has been set through an experiment, and it is electrically stored at the memory of the ECU 40. As shown in FIG. 23, for example, it is set such that the smaller the intake air amount or the EGR difference is, the greater the main-injection amount: QHt is.

Next, in step SE12, respective value of the basic fuel injection amount: QHb and the basic injection timing: ITHb for the pre-mixed combustion are read from respective maps (FIG. 12). In step SE13, the follow-up injection amount: Qfu is obtained by deducting the main-injection amount: QHt from the basic fuel injection amount: QHb. Then, proceeding to step SE5, the main-injection and the follow-up injection are executed respectively, and then it returns.

Step SD1 in the flowchart of FIG. 21 corresponds to the EGR estimation section 40a, and step SD3 corresponds to the operating area determination section. Steps SD4 to SD9 and steps SE1 to SE11 in the flowchart of FIG. 22 correspond to the main-injection control section 40b. The main-injection control section 40b is constituted so as to change the fuel injection mode by the injector 5 to the early injection at the same times as opening of the EGR valve 35 when the operating condition of the engine 1 transfers from the diffusion combustion area (D) to the pre-mixed combustion area (H).

Steps SE5, SE12, SE13 correspond to the latter-injection control section 40c. The latter-injection control section 40c controls the follow-up injection amount in such a manner that the ratio of the follow-up injection amount with respect to the main-injection amount increases with an increase of the actual EGR ratio: EGR (with a decrease of the EGR difference) when the operating condition of the engine 1 transfers from the diffusion combustion area (D) to the pre-mixed combustion area (H).

Accordingly, the combustion control apparatus A according to the second embodiment urges smoke in the exhausted gas to burn again by executing the follow-up injection when the operating condition of the engine 1 transfers between the pre-mixed combustion mode and the diesel combustion mode, like the first embodiment, so that smoke can be reduced.

In addition, in the second embodiment, it is constituted so that the main-injection is executed at relatively early timing of the compression stroke of the cylinder 2 so as to provide always the pre-mixed combustion at the transition of the combustion mode. In this case, by constituting it that the greater the EGR difference is, the less the main-injection fuel amount is, it can be suppressed that the too early ignition itself occurs. Further, even if the too early ignition occurs, a combustion noise and a deterioration of exhaust gas condition, which may be caused thereby, can be reduced.

Further, by constituting it that the main-injection fuel is changed according to the EGR difference as described above and the fuel amount by the follow-up injection is increased with advanced injection timing, the combustion of fuel by the follow-up injection can be made contribute positively to an increase of output torque of the engine 1. As a result, a desired engine output torque can be obtained even if the main-injection is reduced.

Other Embodiments

The present invention is not limited to the above-described embodiments but encompasses other embodiments. For example, the follow-up injection is executed when the operating condition of the engine 1 transfers from one of the pre-mixed combustion area (H) and the diffusion combustion area (D) to the other one thereof in the above embodiments. However, it is not limited to this. For example, the follow-up injection may be executed when the operating condition of the engine 1 is at the pre-mixed combustion area (H) and at the temporary transition from the pre-mixed combustion mode to the diesel combustion mode for increasing the temperature of the catalyst converter 28 or supplying a reducing agent to NOx absorbent, or at its return to the pre-mixed combustion mode.

Further, it may be constituted in the above embodiments that a device for reinforcing a flow in the combustion chamber 4 of the cylinder of the engine 1 (for example, a shutter valve for reinforcing swirl or tumble by closing part of the intake air passage 16, a variable valve timing mechanism or the like) is provided to reinforce the flow in the cylinder 2 when the follow-up injection is executed. Accordingly, the combustion speed of fuel by the follow-up injection can be improved, and thereby a deterioration of fuel consumption caused by the flow-up injection can be suppressed.

Further, although the open/close timing of the intake valve and the exhaust valve is set so that the actual compression ratio of the cylinder of the engine 1 can be about 17 or less in the above embodiments, it may be constituted that a well-known variable valve timing mechanism or the like is provided to adjust the actual compression ratio about 17 or less only when the operating condition of the engine 1 transfers between the both operating area (H) and (D). Namely, if the variable valve timing, for example, is provided at least for changing either an open/close timing or a lift amount of the intake valve, the actual compression ratio, for example, may be decreased by delaying the close timing of the intake valve further after the bottom dead center of cylinder when the operating condition of the engine 1 transfers between the both operating area (H) and (D).

Further, although the fuel injection by the injector 5 begins within the predetermined crank angle range of the compression stroke of the cylinder 2 when the operating condition of the engine 1 transfers to the pre-mixed combustion mode in the above embodiments, it is not limited to this. It may be constituted so that the fuel injection may begin during the intake stroke of the cylinder 2.

What is claimed is:

1. A combustion control apparatus of a diesel engine, comprising a fuel injector projecting into a combustion chamber of a cylinder of an engine, exhaust gas recirculation amount adjusting means for adjusting the amount of recirculated exhaust gas to the combustion chamber, main-injection control means for controlling said fuel injector, so that the fuel injector injects the fuel at least during the intake stroke or the compression stroke of cylinder at a first engine operating condition to make a first combustion state where the rate of pre-mixed combustion is greater than that of diffusion combustion, while so that the fuel injector injects the fuel at least at around the top dead center of the compression stroke of cylinder at a second engine operating condition to make a second combustion state where the rate of diffusion combustion is greater than that of pre-mixed combustion, and exhaust gas recirculation control means for controlling said exhaust gas recirculation amount adjusting means, in which an EGR value relating to the amount of recirculated exhaust gas at said first engine operating condition is larger than a first predetermined value, while the EGR value at said second engine operating condition is smaller than a second predetermined value which is smaller than said first predetermined value, the combustion control apparatus comprising:

latter-injection control means for performing a latter-injection when the engine operating condition transfers from one of said first and second engine operating conditions to the other thereof, wherein the fuel is injected by said fuel injector within a predetermined range of either the expansion stroke or the exhaust stroke of cylinder after the main-injection fuel injected into the combustion chamber by controlling said fuel injector by said main-injection control means begins to burn.

2. The combustion control apparatus of claim 1, wherein the timing of the main-injection at said first engine operating condition is advanced from the timing of that at said second engine operating condition.

3. The combustion control apparatus of claim 1, wherein said latter-injection control means performs the latter-injection by the fuel injector after a heat release rate by the combustion of the main-injection fuel becomes less than a predetermined value.

4. The combustion control apparatus of claim 3, wherein said latter-injection control means performs the latter-injection by the fuel injector so that the combustion of the latter-injection can begin within a certain range beginning at around a certain point, which is when the heat release rate by the combustion of the main-injection fuel becomes about zero, and ending at another point, which is a predetermined crank angle after said certain point.

5. The combustion control apparatus of claim 1, wherein said latter-injection control means controls the timing of the latter-injection within a range of about 10° CA to about 60° CA after the top dead center of the compression stroke of cylinder.

6. The combustion control apparatus of claim 1, further comprising EGR estimation means for estimating an actual EGR value of the engine, wherein said latter-injection control means is constituted so as to perform the latter-injection by the fuel injector based on the EGR value estimated by said EGR estimation means when the EGR value is within a predetermined range between said first and second predetermined values.

7. The combustion control apparatus of claim 1, further comprising main-injection amount compensation means for reducing the amount of the main-injection fuel so as to offset an increase of engine torque by the latter-injection when said latter-injection control means performs the latter-injection.

8. The combustion control apparatus of claim 7, wherein said latter-injection control means controls the amount of the latter-injection fuel, when the engine operating condition transfers from said first engine operating condition to said second engine operating condition and at least after a mode of said main-injection is changed, in such a manner that the greater a difference between a target EGR value and an actual EGR value after the transition of the engine operating condition is, the greater the ratio of the fuel amount of the latter-injection with respect to that of the main-injection is.

9. The combustion control apparatus of claim 1, wherein said first predetermined value of the EGR value is set within a range of about 50 to about 60% of an EGR ratio, while said second predetermined value of the EGR value is set within a range of about 30 to about 40% of the EGR ratio.

10. The combustion control apparatus of claim 1, wherein said latter-injection control means controls the amount of the latter-injection fuel by said fuel injector when the engine operating condition transfers from said second engine operating condition to said first engine operating condition, in such a manner that the greater a target torque of engine is, the more the latter-injection fuel is.

11. The combustion control apparatus of claim 1, wherein said latter-injection control means controls the amount of the latter-injection fuel by said fuel injector when the engine operating condition transfers from said second engine operating condition to said first engine operating condition, in such a manner that the greater a engine speed is, the more the latter-injection fuel is.

12. The combustion control apparatus of claim 1, wherein said latter-injection control means controls the timing of the latter-injection by said fuel injector according to a target torque of engine and an engine speed when the engine operating condition transfers from said second engine operating condition to said first engine operating condition, in such a manner that the greater the target torque of engine is and/or the lower the engine speed is, the more advanced the timing is.

13. The combustion control apparatus of claim 3, further comprising a map in which the timing of the latter-injection is preset correlating the engine operating condition in consideration of an ignition-delay time of the latter-ignition fuel so that the latter-injection fuel can begin to burn at the point of the combustion completion of the main-injection fuel, wherein said latter-injection control means controls the timing of the latter-injection in reference to said map according to the engine operating condition.

14. The combustion control apparatus of claim 6, wherein said latter-injection control means is constituted so that the latter-injection control means can begin the latter-injection by the fuel injector when the EGR value estimated by said EGR estimation means becomes a first middle value between said first and second predetermined values when the engine operating condition transfers from said first engine operating condition to said second engine operating condition, while the latter-injection control means can begin the latter-injection by the fuel injector when the EGR value estimated by said EGR estimation means becomes a second middle value different from said first middle value when the engine operating condition transfers from said second engine operating condition to said first engine operating condition.

15. The combustion control apparatus of claim 7, wherein the more the amount of latter-injection fuel is, the less the amount of main-injection fuel compensated by said main-injection amount compensation means is.

16. The combustion control apparatus of claim 7, wherein the more the timing of the latter-injection is advanced, the less the amount of main-injection fuel compensated by said main-injection amount compensation means is.

17. A combustion control apparatus of a diesel engine, comprising:
a fuel injector projecting into a combustion chamber of a cylinder of an engine;
an exhaust gas recirculation amount adjusting valve adjusting the amount of recirculated exhaust gas to said combustion chamber;
a sensor for sensing an engine speed;
a sensor for sensing the amount of intake air of engine;
a sensor for sensing the amount of accelerator operation; and
a control unit for controlling said fuel injector and said exhaust gas recirculation amount adjusting valve at least according to signals from said sensors,
wherein said control unit comprises:
operating area determination section that determines at least according to the engine speed and the accelerator operation amount whether the engine operation is at a first engine operating area where the engine operation is relatively at low engine load and low engine speed or a second engine operating area where the engine operation is relatively at either high engine load or high engine speed;
main-injection control section that controls said fuel injector, so that the fuel injector injects the fuel during the intake stroke and/or the compression stroke of cylinder at said first engine operating area, while so that the fuel injector injects the fuel at the timing which is delayed from the timing of the first operating area at said second engine operating area;
exhaust gas recirculation control section that controls said exhaust gas recirculation amount adjusting valve, in which an EGR value relating to the amount of recirculated exhaust gas at said first engine operating area is larger than a first predetermined value, while the EGR value at said second engine operating area is smaller than a second predetermined value which is smaller than said first predetermined value;

latter-injection control section that performs a latter-injection when the engine operation transfers from one of said first and second engine operating areas to the other thereof, wherein the latter-injection fuel is injected by said fuel injector after the main-injection fuel injected into the combustion chamber by controlling said fuel injector by said main-injection control section begins to burn and when a heat release rate by the combustion of the main-injection fuel becomes less than a predetermined value; and main-injection amount compensation section that reduces the amount of the main-injection fuel so as to offset an increase of engine torque by the latter-injection when said latter-injection control section performs the latter-injection.

* * * * *